US007389045B2

(12) United States Patent
Fee

(10) Patent No.: US 7,389,045 B2
(45) Date of Patent: Jun. 17, 2008

(54) APPARATUS AND METHOD FOR MONITORING AND COMPENSATING AN OPTICAL SIGNAL

(75) Inventor: John Arthur Fee, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 675 days.

(21) Appl. No.: 10/434,035

(22) Filed: May 8, 2003

(65) Prior Publication Data

US 2004/0223759 A1 Nov. 11, 2004

(51) Int. Cl.
*H04B 10/08* (2006.01)
(52) U.S. Cl. .............................. 398/33; 398/30; 398/32; 398/25; 398/94; 398/197; 372/28; 359/239
(58) Field of Classification Search ................... 398/10, 398/16, 20, 25–33, 67, 94, 147, 177, 196, 398/158, 180, 197; 385/27; 359/177, 124, 359/133, 180, 183, 239; 725/129; 372/28
See application file for complete search history.

(56) References Cited

U.S. PATENT DOCUMENTS

| 5,315,426 | A | * | 5/1994 | Aoki ........................... 398/147 |
| 5,329,396 | A | * | 7/1994 | Fishman et al. ............. 398/147 |
| 5,420,868 | A | | 5/1995 | Chraplyvy et al. |
| 5,513,029 | A | * | 4/1996 | Roberts ........................ 398/32 |
| 5,592,282 | A | | 1/1997 | Hartog |
| 5,892,607 | A | | 4/1999 | Atlas |
| 5,900,959 | A | * | 5/1999 | Noda et al. .................. 398/195 |
| 5,914,794 | A | | 6/1999 | Fee et al. |
| 6,072,614 | A | * | 6/2000 | Roberts ....................... 398/177 |
| 6,072,618 | A | * | 6/2000 | Takenaka .................... 359/239 |
| 6,108,113 | A | * | 8/2000 | Fee .............................. 398/16 |
| 6,285,475 | B1 | | 9/2001 | Fee |
| 6,331,908 | B1 | | 12/2001 | Adams et al. |
| 6,626,588 | B1 | * | 9/2003 | Sasai et al. ................... 398/32 |
| 6,661,814 | B1 | * | 12/2003 | Chapman et al. .............. 372/6 |
| 2005/0262545 | A1 | * | 11/2005 | Masuda et al. ............. 725/129 |

OTHER PUBLICATIONS

Green, Jr., Paul E., "*Fiber Optic Networks*", Prentice Hall, Inc., 1993, pp. 90, and 244.
Minoli, D., "*Digital Transmissions and Fiber Optic Technology and Transmission Systems*", Telecommunications Handbook, Artech House, Inc., Norwood, MA @1991, pp. 101-168 and 341-387.

* cited by examiner

*Primary Examiner*—Kenneth Vanderpuye
*Assistant Examiner*—Li Liu

(57) ABSTRACT

Optical communication apparatuses and optical communication methods are provided. According to one aspect, an optical communication apparatus includes a communication path configured to communicate a first signal; a signal generator configured to provide a second signal; a combiner configured to combine the first signal with the second signal to provide a composite signal; and a light source coupled with the combiner and configured to receive the composite signal and to output an optical signal corresponding to the composite signal to an optical conduit, wherein the signal generator is configured to monitor the application of the optical signal to the optical conduit and to alter the second signal responsive to the monitoring.

34 Claims, 16 Drawing Sheets

TYPICAL OPTICAL SPAN IMPLEMENTATION

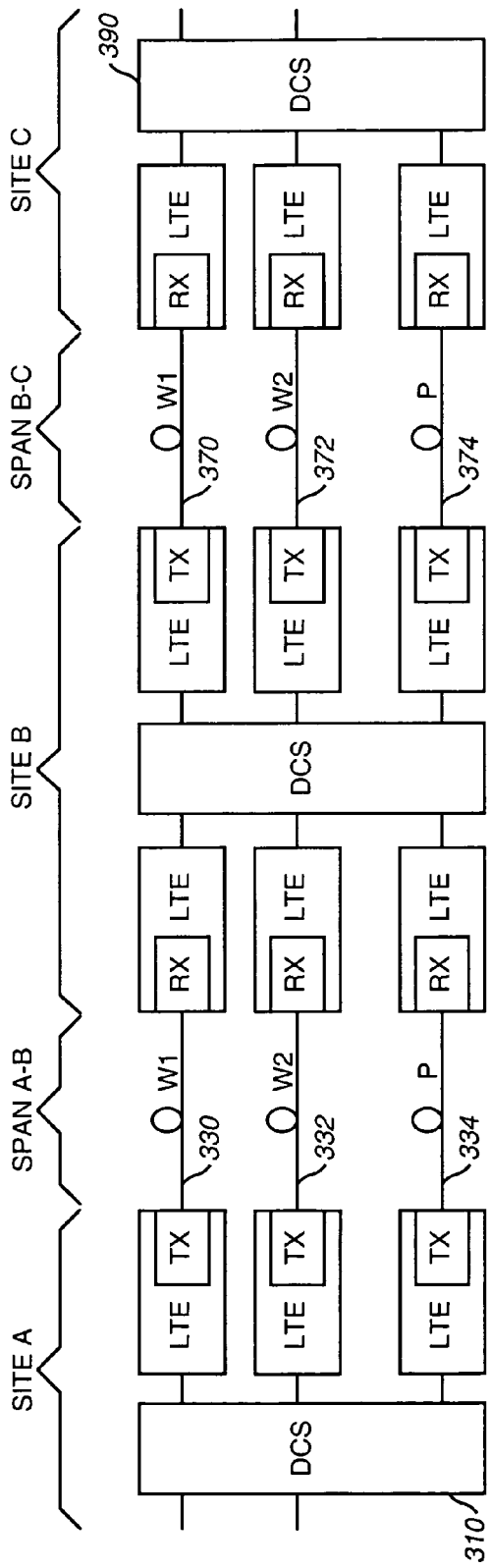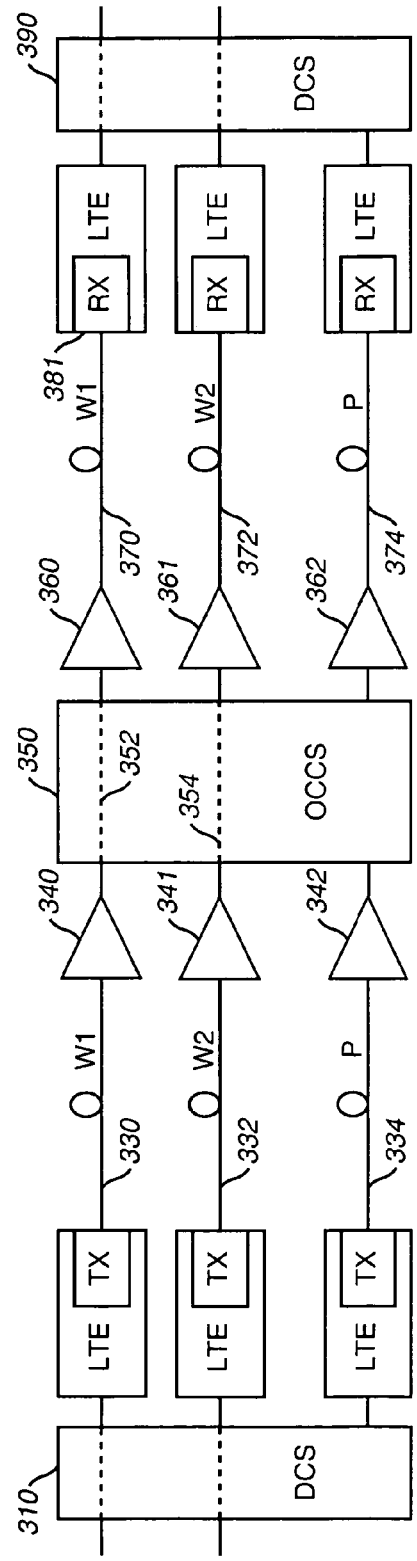
FIG. 3A  Prior Art  TYPICAL NETWORK WITH OPTOELECTRONICS AT SITE B
FIG. 3B  Prior Art  SITE B EQUIPPED FOR OPTICAL DOMAIN ONLY

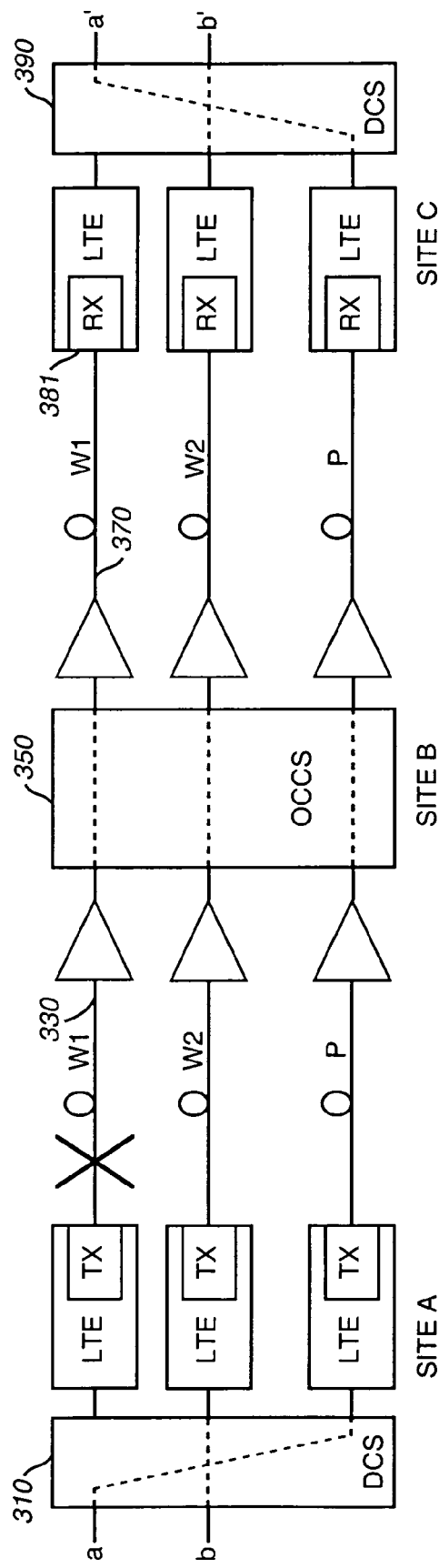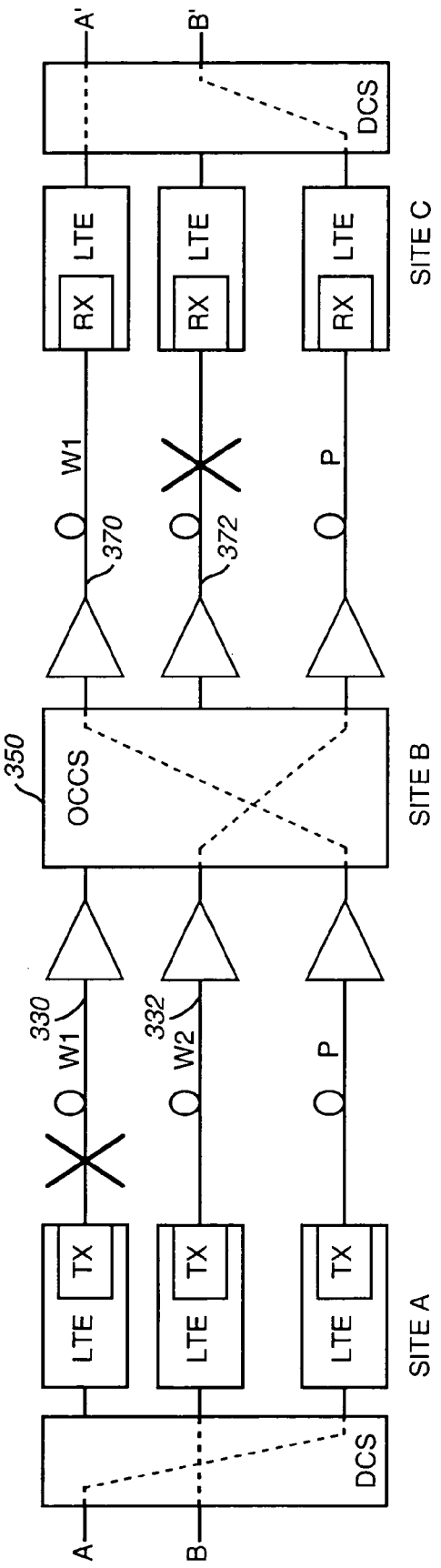
FIG. 3C SWITCHING a-a' TO PROTECT FIBER
FIG. 3D OPTICAL LINE SWITCHING TO BYPASS FAILED LINKS

SIMPLE PHOTODIODE DETECTION - NORMAL CONDITIONS

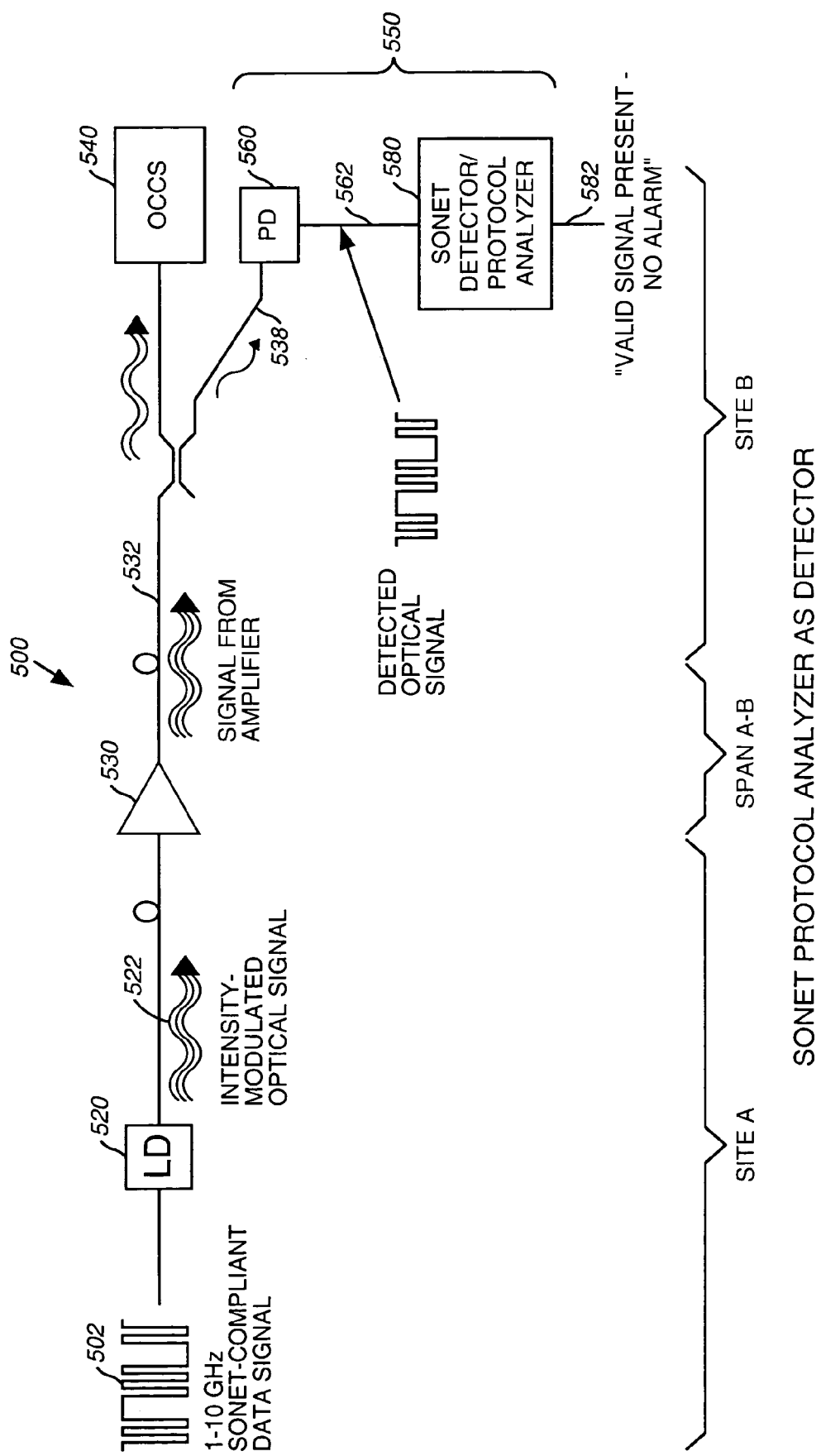

LOW-LEVEL, LOW-FREQUENCY MODULATION AND DETECTION - NORMAL CONDITIONS

LOW-LEVEL, LOW-FREQUENCY MODULATION AND DETECTION - FAILURE DETECTED

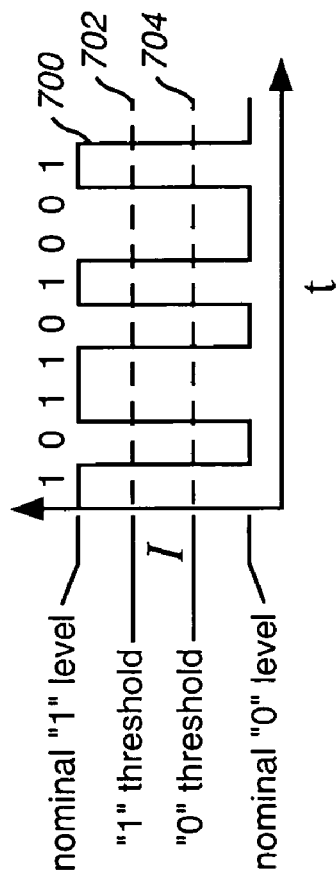
FIG. 7A INTENSITY-MODULATED OPTICAL SIGNAL
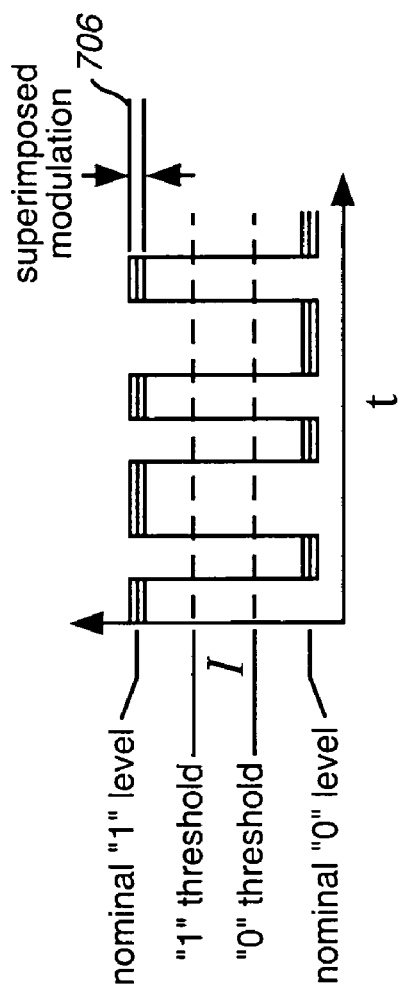
FIG. 7B SUPERIMPOSED LOW-LEVEL MODULATION

TYPICAL NRZ SPECTRUM

ADDED LOW-LEVEL, LOW-FREQUENCY SIGNAL

ADDED MODULATED SOURCE AND DEMODULATOR FOR ANCILLARY DATA TRANSPORT

APPARATUS AND METHOD FOR MONITORING AND COMPENSATING AN OPTICAL SIGNAL

CROSS-REFERENCE TO RELATED APPLICATIONS

The following U.S. patents and/or commonly assigned patent applications are hereby incorporated herein by reference:

| Pat. or Ser. No. | Filing Date | Issue Date |
| --- | --- | --- |
| 5,914,794 | Dec. 31, 1996 | Jun. 22, 1999 |
| 6,108,113 | Jun. 28, 1996 | Aug. 22, 2000 |
| 6,285,475 | Dec. 29, 1995 | Sep. 4, 2001 |

TECHNICAL FIELD

The present invention relates to optical communication apparatuses and optical communication methods.

BACKGROUND OF THE INVENTION

A communication network serves to transport information between a number of locations. The information is usually presented to the network in the form of time-domain electrical signals and may represent any combination of telephony, video, or computer data in a variety of formats. A typical communication network consists of various physical sites, called nodes, interconnected by information conduits, called "links." Each link serves to carry information from one site to another site. Individual sites contain equipment for combining, separating, transforming, conditioning, and/or routing data.

The traffic of even a single link represents a formidable volume of vital data-equivalent to tens of thousands of phone calls. Sudden failure of a data link can cause a significant loss in revenues for a network owner and loss of commerce and other benefits for the network subscribers. Consequently, restoration techniques have been devised to circumvent a network link failure and to restore normal traffic flow soon.

FIG. 1 shows an example of a typical communications network 100 consisting of sites 101-105 connected by links 120-121. Links are generally implemented using electrical cables, satellites, radio or microwave signals, or optical connections and can stretch for tens or hundreds of miles between sites. Through these links, the communications system 100 carries data signals among the sites 101-105 to effectively interconnect data remote equipments 111-115, i.e. computers, remote terminals, servers, etc. One or more links 120 and 121 that connect two sites are collectively referred to as a span 130.

A span often includes multiple parallel links to increase working and spare capacity. Redundant spare links are commonly added between sites with the intent that they usually carry no data traffic but are available as alternate routes in the event of partial network failure affecting working links. If the network detects a link failure such as a fiber failure, cable cut, or transmitter/receiver nodal failure, traffic may be automatically switched from the failed link to an available spare link.

A typical implementation of a high data rate optical span is depicted in FIG. 2. In FIG. 2, a given Site A is connected to another Site B by a span consisting of three optical fibers 230, 232, 234. Two electrical data signals are presented at Site A via inputs 202 and 204. These signals are carried through the network span and recovered at Site B as electrical signal outputs 262 and 264 respectively. For example, these data signals can be STS-48 synchronous data signals each bearing digital data at about 2.5 Gbps or the equivalent of 32 thousand telephone-quality voice channels.

At Site A, the signals enter a digital cross-connect switch 210, and under normal conditions appear as electrical signals along connections 212 and 214. The signal at connection 212 enters an optical Lightwave or Line Terminal Equipment (LTE) 220 shown to include an optical transmitter 221, such as a semiconductor laser. Light emitted by the transmitter 221 is intensity-modulated by the electrical data signal that enters along connection 212 to deliver a modulated optical output signal over optical fiber 230.

After traversing the length of fiber 230, the optical signal arrives at Site B and enters a receiver 241 such as a photodiode. The receiver 241 is shown to be a part of an LTE 230 that amplifies and conditions the signal to render a faithful electrical reproduction at output port 252 of the original electrical data signal provided at input 202. In a similar manner, an electrical data signal presented at input 204 is transported by LTE 222, fiber 232, and LTE 242 to output port 254.

Under normal circumstances, the digital cross-connect switch DCS 260 simply connects port 252 to output port 262 to complete the end-to-end connection of input 202 to output 262. Likewise, DCS 260 normally connects line 254 to output 264 to complete the end-to-end connection of input 204 to output 264.

In FIG. 2, fibers 230 and 232 are referred to as working fibers because they both carry data traffic when all network elements are functioning properly. In contrast, fiber 234 is said to be a spare or "protect" fiber because it carries data traffic only in the event of failure of one of the working fibers 230 or 232 or of the associated LTEs 220, 222, 240, and 242. Under normal circumstances, protect fiber 234 does not carry an optical data signal.

When a failure occurs along one of the working fibers 230, 232, digital cross-connect switches 210 and 260 switch data traffic onto the protect fiber 234. For example, if fiber 230 becomes too damaged to transmit light, switch 210 connects input 202 to connection 216. At the same time, DCS 260 disconnects connection 252 and connects output port 262 to connection 256. This switching action restores end-to-end connectivity between input 202 and output 262 despite the failure of working fiber 230.

To successfully perform restoration switching, however, it is necessary to detect failures and to coordinate switching action at each node. As shown in FIG. 2, a separate digital communication network is provided between sites for signaling status and switching commands between DCS 220 and DCS 260. Controller 250 is assigned to Site A to accept alarm inputs 255 from LTEs 220, 222, and 224. Controller 250 also directs the switching action of DCS 210 via control connection 253. A similar Controller 252 resides at Site B to accept alarm inputs 256 from LTEs 240, 242, and 244 and to exercise control over DCS 260 via control connection 254. Each Controller 250, 252 is typically an imbedded microprocessor, computer, workstation, or other type of processor for controlling the switching of lightwave terminal equipment, digital cross-connect switches, and optical cross-connect switches.

Controllers 250 and 252 communicate and coordinate with each other over a separate communications link 251. For example, status messages can be sent to indicate, acknowledge, or confirm a link or node state such as an idle, active, inactive, or detected fault state. Any digital signaling protocol can be used such as X.25, Frame Relay, ATM, B-ISDN or Common Channel Signaling 7 protocols. Alternatively, controllers 250 and 251 can communicate status messages using overhead bits or bytes within the data protocol that traverses the working fibers. Restoration algorithms and protocols applied within the controllers to restore end-to-end connectivity in response to a fault detection are well known to those skilled in the art. A central network management system for controlling network operations can be used in addition to or instead of the controllers 250, 252.

Thus, the ability to restore network service depends upon the ability to detect and locate failed network components. Faults have been detected in the electrical domain at LTEs. A transmitter 221 can detect a failed laser diode, for example, by monitoring its bias current. Some transmitters also incorporate a backwave detector. This is a photodiode that picks up the light emerging from the back of the laser diode and can detect the loss of laser output.

A laser diode failure within transmitter 221 can cause LTE 220 to report an alarm condition along an alarm connection 255 to the controller 250. The controller 250 can then direct switching of signals from port 221 to port 216. The controller 250 can also send signals along line 251 to controller 252 at Site B to cause switch 260 to connect port 256 to output port 262.

A receiver 241 can detect the presence of light delivered through fiber 230. A receiver 241 may also monitor bias current of a photodiode, if so equipped. Breakage of fiber 230 or failure of receive element 241 can cause LTE 240 to generate an alarm signal along an alarm connection 256 to controller 252. The controller 252 may then directly control switch 260 and indirectly control switch 210 to circumvent the failed fiber 230 or failed receiver 241.

Another way to detect signal presence at the receive end is by the use of a protocol analyzer that looks for specific data patterns, for example data frame alignment bits, in the digital electrical signal. This detection is usually inherent in the course of handling such signals in the electrical domain. Therefore, LTE 240 could also generate a "loss of frame" alarm to controller 252.

With reference now to FIGS. 3A-3D, the description of operation provided for elements in FIG. 2 applies to the like elements in FIG. 3A-3D. The alarm and controller elements are purposely omitted from the drawing for the sake of clarity.

FIG. 3A is an expansion of FIG. 2 to encompass another Span B-C connected to Site C. Electrical DCS switches 310,390 are provided at respective endpoint Sites A, C. Traffic between Sites A and C travels through an intermediate optical/electronic Site B. Spans A-B and B-C interconnect the sites as shown. Span A-B includes working fibers 330,332 and protects fiber 334. Span B-C includes working fibers 370,372 and protects fiber 374. Thus, FIG. 3A illustrates the common practice of performing optical-electrical-optical conversion at each site.

In contrast, FIG. 3B represents the more recent, preferred approach of performing more data signal handling in the optical domain. Compared to conventional optical-electronic switching, Spans A-B and B-C are optically interconnected at Site B. FIG. 3B shows that an entire set of LTEs and a DCS at Site B have been replaced by an optical cross connect switch (OCCS) 350 and several optical amplifiers 340-342 and 360-362. Note that the approach of FIG. 3B requires less equipment and removes the intrinsic data rate limitations imposed by intermediate electrical equipment.

The optical switch 350 is capable of being controlled in the same way as the digital cross-connects. An electrical control signal (or an optical control signal) drives the optical switch to selectively form optical connections among various input and output ports facing optical fibers 330-334, 370-374. For example, internal connections 352 and 354 within the OCCS 350 optically couple respective working fibers 330,332,370,372 in both spans A-B, B-C under normal network conditions as shown in FIG. 3B. The optical amplifiers 340-342, 360-362 intensify the lightwave signal and compensate for losses introduced by the working and protect fibers and the OCCS 350.

While the approach of FIG. 3B is advantageous and represents the current trend towards implementing all-optical networks, a new problem is introduced in reliably detecting and locating failures. Without the receivers and LTEs at Site B, it is no longer possible to detect failure along fiber 330 as distinct from failure along fiber 370. In particular, lightwave terminal equipment located at the endpoints of optically interconnected spans cannot distinguish which span causes a communication failure. Therefore, the optical switching function within Site B cannot be usefully employed to bypass failed elements.

This problem is even better understood by examining FIGS. 3C and 3D. In FIG. 3C, fiber 330 has been cut. This failure is detected by receiver 381 at site C. Without a separate detection at intermediate node B, however, the failure cannot be pinpointed to fiber 330 or fiber 370. Any controller receiving an alarm from receiver 381 at an endpoint node must assume that both fibers 330 and 370 have failed.

Restorative switching on a path basis between endpoints can be performed through DCS switches 310 and 390 as shown. For purposes of line protection switching and restoration, this recovery scheme leaves optical switch 350 no more useful than straight permanent connections. This amounts to what is called path protect switching in that entire paths between endpoint sites are switched. The problem is exacerbated as more working and spare fibers are taken into account.

Proper switching of OCCS 350 can provide a greater number of restoration paths. For example, compound failures as depicted in FIG. 3D can be restored. Such versatile restoration line switching can only occur when fault detection capability is provided at Site B to distinguish span A-B failures from span B-C failures.

One associated problem experienced with communications within an optical communication network is Stimulated Brillouin Scattering (SBS). Stimulated Brillouin Scattering is described in Paul E. Green, Jr., *Fiberoptic Networks* (1993 Prentice Hall), incorporated herein by reference. SBS is a type of stimulated light scattering where light is scattered from refractive index variations that are produced or amplified by the interaction of laser light with the material system. SBS is a non-linear effect in optical fibers in which, above a certain threshold, light emitted by the transmitter is reflected back towards it. There exists a need to account for SBS to provide enhanced communications.

SUMMARY OF THE INVENTION

According to one aspect of the present invention, an optical communication apparatus comprises: a communication path configured to communicate a first signal; a signal generator configured to provide a second signal; a combiner configured to combine the first signal with the second signal to provide a composite signal; and a light source coupled with the combiner and configured to receive the composite signal and to output an optical signal corresponding to the composite signal to an optical conduit, wherein the signal generator is configured to monitor the application of the optical signal to the optical conduit and to alter the second signal responsive to the monitoring.

Another aspect of the present invention provides an optical communication apparatus comprising: a light source adapted to couple with an optical conduit and configured to apply an optical signal responsive to a data signal to the optical conduit; and a signal generator configured to monitor Stimulated Brillouin Scattering during application of the optical signal to the optical conduit, and to alter the data signal responsive to the monitoring.

According to another aspect, the present invention provides an optical communication method comprising: providing a first signal and a second signal; combining the first signal with the second signal to provide a composite signal; generating an optical signal corresponding to the composite signal; applying the optical signal to an optical conduit; monitoring the applying; and altering the second signal responsive to the monitoring.

Yet another aspect of the present invention provides an optical communication method comprising: providing an optical signal; applying the optical signal to an optical conduit; monitoring Stimulated Brillouin Scattering during the applying; and altering the optical signal responsive to the monitoring.

BRIEF DESCRIPTION OF THE DRAWINGS

Preferred embodiments of the invention are described below with reference to the following accompanying drawings.

FIGS. 3A to 3D each illustrate a portion of an optical network showing the role of intermediate optical cross connect switches;

FIG. 4A shows the detection of the presence or absence of a tapped optical signal without noise. FIG. 4B shows the detection of a tapped optical noise signal misinterpreted as the presence of a valid optical data signal;

FIG. 5 is a block diagram of a fault detection technique using a protocol analyzer;

FIG. 6A shows the detection of the presence or absence of a tapped sub-carrier modulated optical signal without noise. FIG. 6B shows the detection of the absence of a sub-carrier modulated optical signal despite the presence of noise;

FIGS. 7A and 7B are time-axis graphs to illustrate a composite optical signal before and after the addition of a low-level sub-carrier;

DETAILED DESCRIPTION OF THE PREFERRED EMBODIMENTS

Figure 1:
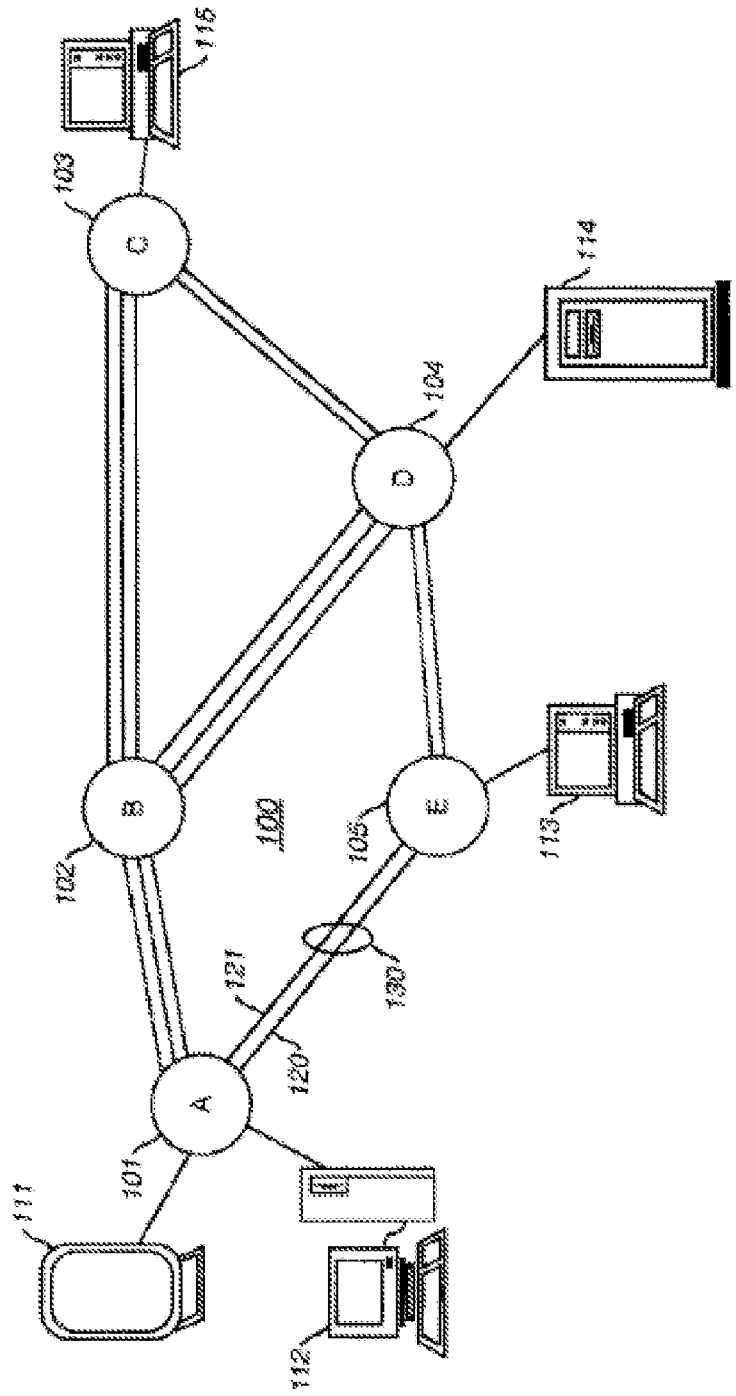
FIG. 1 is an illustration of a typical communications network.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Exemplary communication networks are described in detail in U.S. Pat. No. 5,914,794, incorporated herein by reference, and U.S. Pat. No. 6,108,113, each of which is incorporated herein by reference.

The preferred embodiment of the present invention detects optical faults by tapping a portion of a data signal from along a fiber link in an optical switching network. The tapped data signal is evaluated to determine whether an optical fault exists along the fiber link. In this way, optical faults such as a fiber failure, cable cut, or nodal LTE failure occurring within a network path, are isolated to a specific fiber span or link. Versatile optical switching can occur between spans in an all-optical core network to restore end-to-end path communication.

In one embodiment, a presence detector simply evaluates the magnitude of the tapped signal to determine an optical fault. In a second embodiment, a protocol analyzer evaluates selected bits or fields of the protocol used in the tapped data signal to determine an optical fault.

In a third embodiment, a sub-carrier modulation signal is added to the high rate data signal prior to transport over the link. The sub-carrier signal is significantly lower in both frequency and amplitude than the main data signal so as to not impact reliable reception of the main data signal. A low-pass filter tuned to the sub-carrier modulation signal filters the tapped data signal. In the third embodiment, fault can be determined reliably and cheaply by detecting the sub-carrier signal.

According to a fourth embodiment, ancillary network data is conveyed through a sub-carrier modulation signal. By demodulating the sub-carrier signal, the ancillary network data can be recovered at any point along an optical network link. The recovered ancillary network data is useful for a myriad of network applications including tracing network timing references, cumulative link identification, wavelength re-mapping and re-use, telemetry and transmission performance evaluation, customer data payload identification, operational status indication, and/or other network management operations.

The present invention is described in the example environment of a fiber optic communication network. In particular, fault detection and ancillary data transport along a long-distance fiber optic link in an all-optical switching network is considered. Description in these terms is provided for convenience only. It is not intended that the invention be limited to application in this example environment. In fact, after reading the following description, it will become apparent to a person skilled in the relevant art how to implement the invention in alternative environments.

Figure 2:
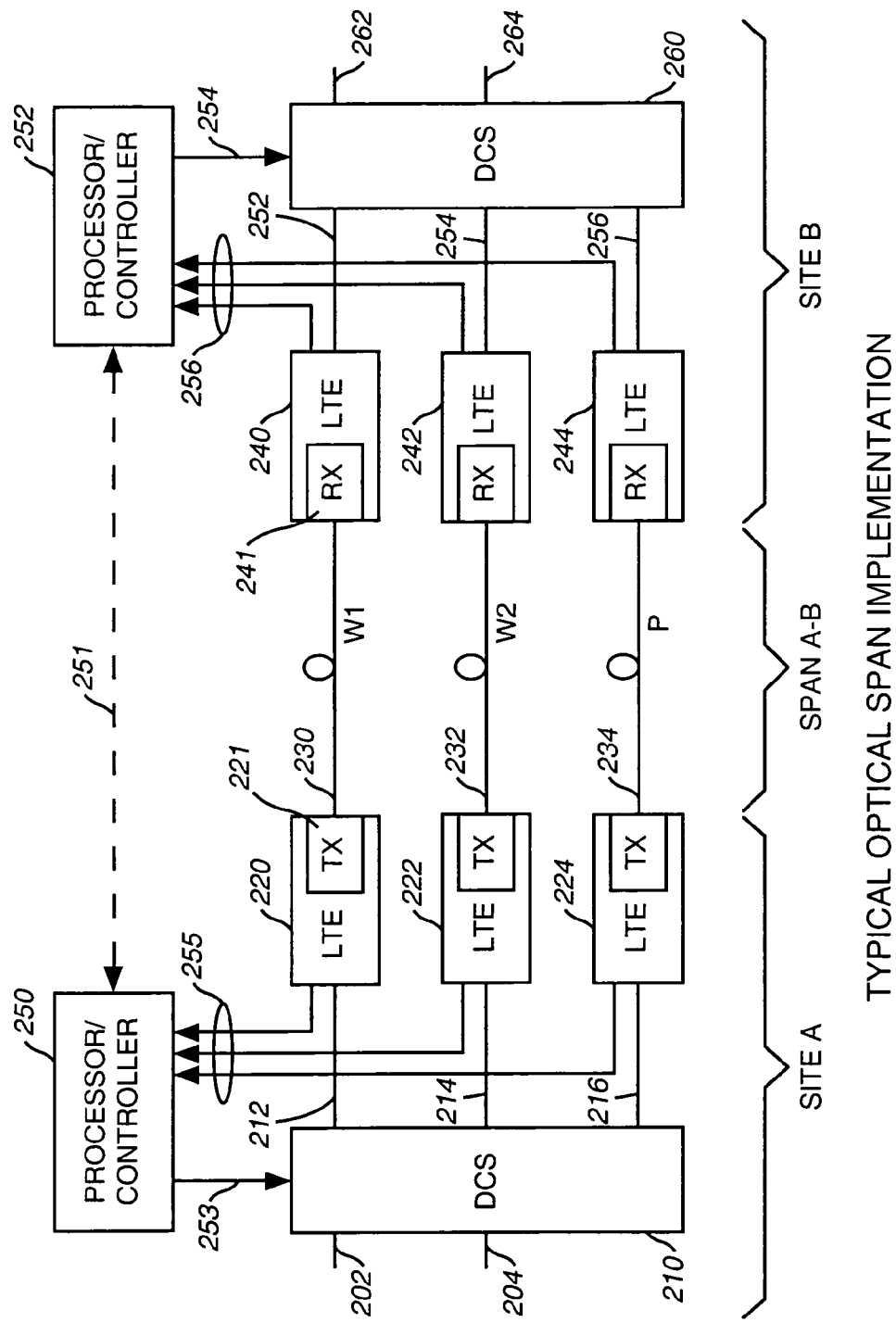
FIG. 2 is a block diagram of the electrical and optical components employed in an optical data communications span.
Figure 4A:
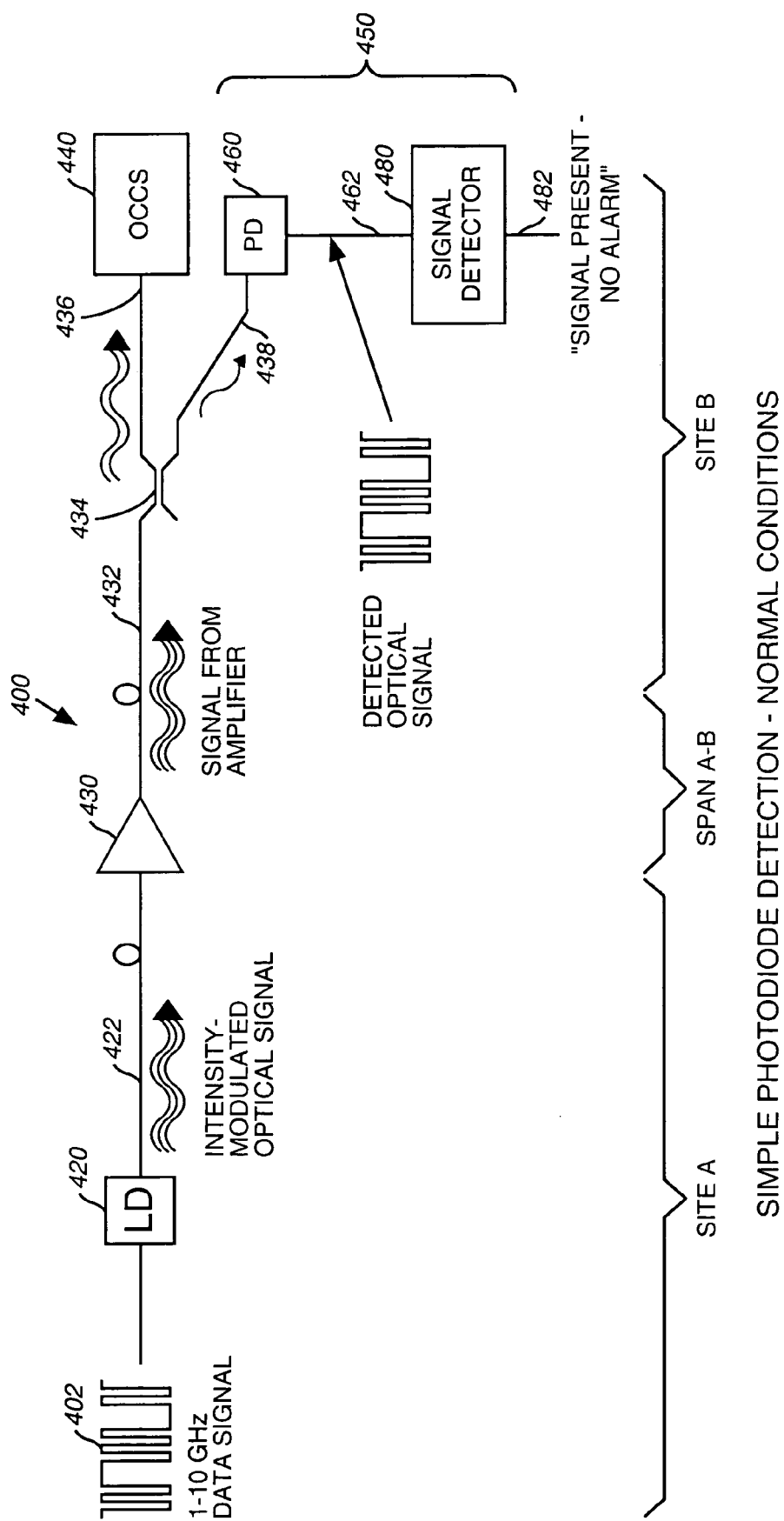
FIGS. 4A and 4B are block diagrams of a fault detection technique using a signal detector.
Figure 4B:
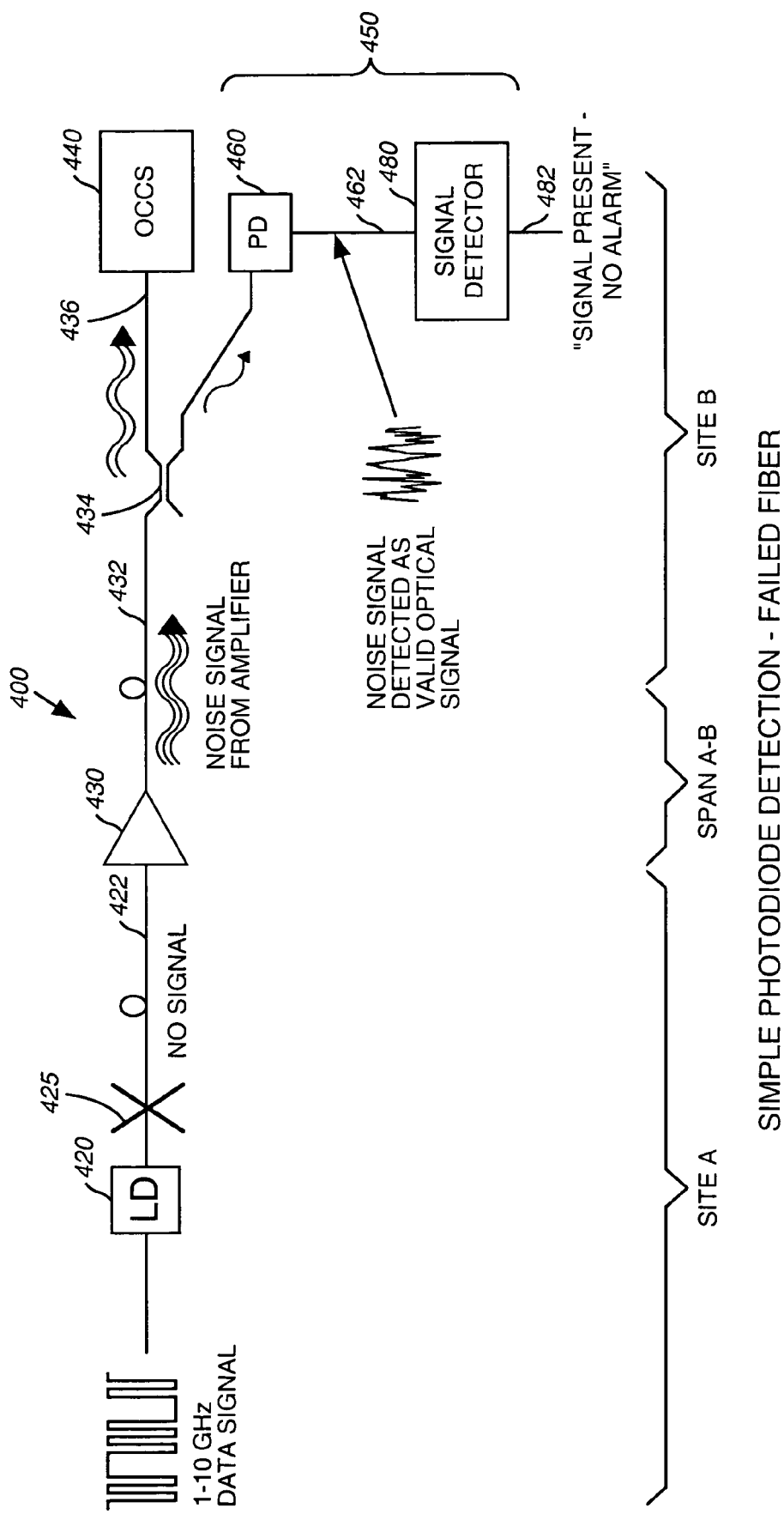

FIGS. 4A and 4B are block diagrams of a network link fault detection technique using a signal detector in accordance with a first embodiment of the present invention. FIG. 4A shows the detection of the presence or absence of a tapped optical signal without noise along a fiber link 400. Fiber link 400 is included in a long-distance span A-B connecting sites A and B. Multiple working/and or spare links can be added. For further clarity, only one endpoint site A and an intermediate site B are shown for the network. Additional interconnected sites can be linked through spans to sites A and B as described with respect to FIGS. 1 to 3 to expand the network. Thus, fiber link 400 constitutes a segment of one or more paths between network endpoint sites. In an all-optical core network, data is switched optically at intermediate nodes such as site B, and injected and recovered from the network in lightwave terminal equipment at the endpoint sites, such as site A.

At site A, a laser diode 420 is driven at a high data rate by a 1-10 GHz data signal 402 to produce an intensity modulated optical data signal, i.e. an Optical Carrier OC-192 signal. In general, any type of high data rate modulated optical source can be used, such as an integrated-type of direct modulated laser or an externally modulated laser, depending upon the required performance, cost, and other known design considerations.

The modulated optical signal is transported over fiber link 400 in span A-B to site B. After traveling a considerable distance, the signal may be strengthened by an optical amplifier 430 (or a lightwave re-generator) and further sent along fiber 432. Multiple optical amplifiers can be spaced along a fiber link to increase range.

The modulated optical data signal carried through fiber 432 eventually reaches an optical cross-connect switch 440 at a distant site B. Because the OCCS is located at an intermediate site or node, OCCS 440 can switch optical connections between multiple working and/or spare fibers as described earlier with respect to OCCS 350.

OCCS 440 can be any type of multi-port optical cross-connect switch. In principle for a N×N OCCS any number of ports, e.g. N=1, 2, 4, 8, 16, 40, 72, 128, or 256, can be switched. Any type of optical switch can be used depending upon the available technology. See, e.g., the integrated lithium niobate directional-coupler type switches discussed by Waynant, R. et al., Eds., Electro-Optics Handbook, McGraw-Hill, Inc. U.S.A. (1994), chapter 26, and especially page 26.34 (incorporated herein by reference). Other types of suitable optical switching technology include switches based on a thermo-optic effect in polymer waveguides or silica glass, semiconductor amplification, piezo movement, and integrated indium phosphide.

In addition, while a single OCCS 440 is shown schematically for clarity, multiple discrete switches and couplers can be used to perform equivalent multiple-port optical switching. For example, a set of discrete 1×2 or 2×2 optical switches can used to switch individual signals between working and protect fibers in different spans. Y-couplers and directional couplers can also be used.

According to the present invention, an optical coupler 434 is provided for coupling a portion of the modulated optical data signal from optical fiber 432 through fiber 438 to a fault detection receiver 450. For example, a tapped optical coupler (e.g. 90/10 2×2 asymmetric coupler) can be used to tap a fraction of the optical signal. It is desirable that most of the optical signal continue along fiber 436 to switch 440 in order to assure reliable reception at a remote LTE receiver.

In the first embodiment, receiver 450 includes a photodiode 460 for detecting the tapped optical data signal. A fast, responsive photodiode 460 produces an electrical signal 462 representative of the tapped optical data signal received from fiber 438 which is provided to a signal detector processor 480. For example, signal detector processor 480 can comprise any combination of rectifier, low-pass filter, thresholding, comparator, and hysteresis circuitry. The output of signal detector processor 482 indicates whether photodiode 460 is receiving any optical signal.

When the fiber link 400 is relatively noise-free, the electrical signal 462 output from the photodiode is representative of the original data signal 402. Signal detector processor 480 then accurately indicates that an optical data signal from link 400 is present when it detects an electrically modulated signal 462.

As shown in FIG. 4B, however, some optical faults can avoid detection due to optical noise introduced by optical amplifiers located downstream of a fiber fault. For example, when a fiber cut 425 prevents the output of laser 420 from propagating through fiber 422, there is no signal present at the input of optical amplifier 430. It is characteristic of such amplifiers to output a broad spectrum of noise or oscillations whenever there is no injected input signal. Therefore, the amplifier 430 will generate output light along fiber 432 despite the failure upstream at fiber 422. The photodiode 460 will transduce this noisy optical signal into an electrical signal 462. Absent sophisticated discrimination electronics, the signal detector 480 can potentially interpret the presence of the detected optical noise signal as an indication that optical data traffic is passing through the link.

Further, when the optical data signal is weak at the end of fiber link 400, the tapped fraction of the optical data signal is correspondingly weaker. Therefore, in some cases, the weaker tapped optical signal will not be detected even though the data optical signal is still recoverable resulting in a false alarm indication at output 482. Thus, the receiver 450 in the first embodiment is better suited for detecting strong optical data signals from a fiber link free of potential optical noise sources such as light amplifiers.

FIG. 5 is a block diagram of a fault detection technique using a more sophisticated receiver 550 having a protocol analyzer 580 in accordance with a second embodiment of the present invention. As indicated by the like-numbered reference numerals, the example embodiment of FIG. 5 differs from that described with respect to FIG. 4 only in the substitution of a more sophisticated protocol analyzer 580 for the signal detector 480.

A digital modulating signal 502 is input that complies with a specific standard protocol, for example, a SONET-compliant STS-48 signal. In general any digital data signaling protocol acceptable to an optical network can be used such as Optical Carrier signals, OC-1 to 192, as long as overhead bits and/or byte patterns can be recognized to verify the presence of a valid optical data signal. See, e.g., the high-level discussion of SONET overhead protocol in "Digital Transmission Systems and Fiber Optic Technology and Transmission Systems," chapter 3 in Minoli, D., Telecommunications Technology Handbook, Artech House, Norwood, Mass. (1995) (incorporated in its entirety by reference herein).

Laser diode 520 is modulated by this signal and propagates the optical signal through fiber 522, amplifier 530, and fiber 532 to eventually reach both the optical switch 540 and photodetector 560. The photodetector output signal 562 is fed to a SONET-compliant analyzer 580 that can determine whether predetermined alignment bits and/or byte patterns in the protocol overhead signals are present.

A protocol analyzer 580 such as a SONET detector, while more costly and complex than a simple thresholding detector, avoids the difficulties presented in FIG. 4B because the analyzer 580 can distinguish between an adherent data signal (properly formatted) and a spurious noise signal.

Figure 6A:
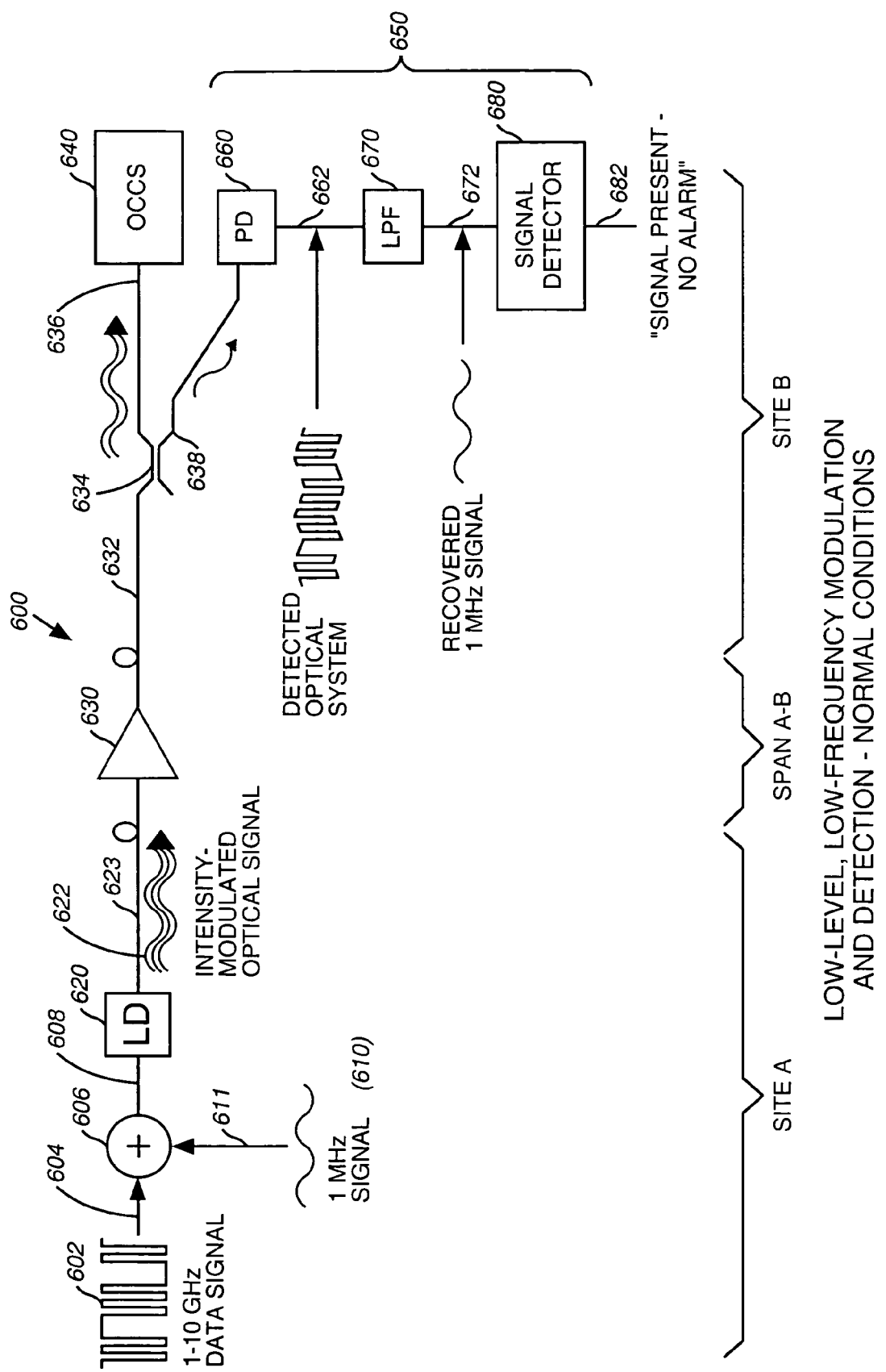
FIGS. 6A and 6B are block diagrams of a fault detection technique recovering a sub-carrier modulation signal.
Figure 6B:
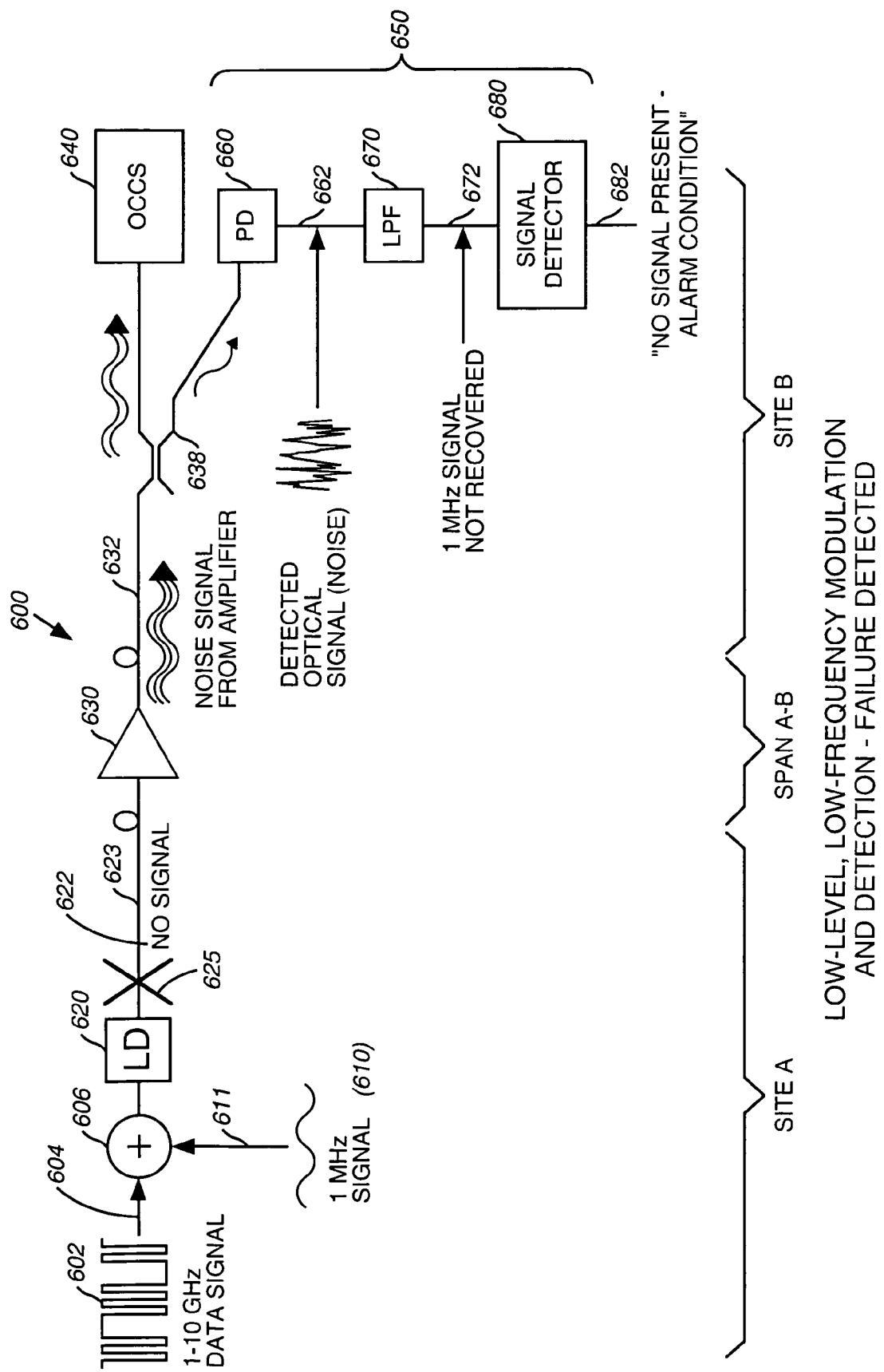

FIGS. 6A and 6B are block diagrams of a fault detection technique recovering a sub-carrier modulation signal or monitoring signal from a fiber link 600 in accordance with a third embodiment of the present invention. A receiver 650 is provided which includes a photodiode 660, low-pass filter 670, and signal detector processor 680 for recovering the sub-carrier modulation to determine optical fault. FIG. 6A shows the detection of the presence or absence of a tapped sub-carrier modulated optical signal without noise. FIG. 6B shows the detection of the absence of a sub-carrier modulated optical signal despite the presence of noise.

With reference to FIG. 6A, a high data rate electrical signal 602 is presented at an input 604 to signal combiner 606. A monitoring sub-carrier signal 610 is incident at a second input 611 to the combiner 606. The linear summation of signals 602 and 610 appear at the output of the combiner 608 and then this composite signal is used to intensity modulate laser diode 620.

The monitoring sub-carrier signal 610 is of substantially lower frequency and amplitude than the main data signal 602. In a preferred embodiment, the frequency of the superimposed monitoring signal 610 is several orders of magnitude less than that of the data signal 602. For example, if data signal 602 is on the order of 1 to 10 GHz, i.e. a SONET-compliant STS-48 digital signal (approx. 2.5 Ghz.) or an Optical Carrier OC-192 signal (approx. 9.9 GHz.), a useful sub-carrier signal 610 may range from 1 kHz to 10 MHz, depending on the response bandwidth of photodetectors 660 used at the receiver 650. Further, the monitoring sub-carrier signal 610 has a fraction, i.e. one-tenth, of the amplitude of the main data signal 602. Other ranges of amplitudes and frequencies for the sub-carrier modulation signal 610 and the main data signal 602 can be selected.

In FIG. 6A, the light output 622 of laser diode 620, modulated by the composite signal along input 608, propagates through fiber 623, amplifier 630, and fiber 632. The optical signal then enters coupler 634 and most of the light emerges along line 636 and enters the optical switch 640.

At coupler 634, a small portion of the light is diverted along fiber 638 and enters a photodetector 660. Because the intent of photodetector 660 is to recover the low frequency monitoring signal 610 from the optical signal, the photodetector 660 may be implemented using inexpensive photodiodes, phototransistors, or passive photoresistive devices. Although in FIG. 6A the output of the photodetector 662 shows a recovered main data signal entering a low-pass filter 670, the photodetector 660 and low pass filter 670 may be considered combined into a single unit when inexpensive, slow-responding optical detectors are used.

A replica 672 of the monitoring signal is recovered input to signal detector 680. This signal detector 680 may include a tone detector tuned to the sub-carrier modulation frequency to selectively determine the presence of the monitoring signal 610 within the optical signal incident along fiber 632. The output 682 of the signal detector 680 represents a "Signal Present-No Alarm" when the monitoring sub-carrier modulation signal 610 has been detected and recovered. Hardware and/or software can be used for implementing a low-pass filter 670 and signal detector processor 680.

FIG. 6B depicts the apparatus of FIG. 6A having suffered a fiber cut 625 along fiber 623. As described with respect to FIG. 4B, even though there is no light signal 622 along fiber 623, the optical amplifier 630 generates a noise signal so that light does propagate along fiber 632. This noise signal however does not satisfy constitute a regular modulated signal akin to the monitoring sub-carrier signal 610 and is not passed by the LPF 670. Signal detector 680 therefore detects the loss of the optical sub-carrier modulation signal and issues an alarm condition at output 682 indicating that "No Signal is Present."

FIGS. 7A and 7B are time-axis graphs to illustrate a composite optical signal before and after the addition of a low-level sub-carrier in accordance with the third embodiment of the present invention. FIG. 7A shows a time-axis plot of an idealized digital modulating signal 700 that might be present at input 604 of FIG. 6A. The detection thresholds 702 and 704 are juxtaposed to show that there is substantial margin to allow for reliable discernment of 1's and 0's. FIG. 7B shows the effect of linearly adding a low-level sub-carrier modulation 706 to the idealized digital modulation signal 700 in accordance with the present invention. The sub-carrier modulation 706 appears as a slight amplitude jitter or drift within the main signal. The sub-carrier effects are mild enough so that the high data rate 1's and 0's are still discernable by LTE at a receiving network site.

Figure 8A:
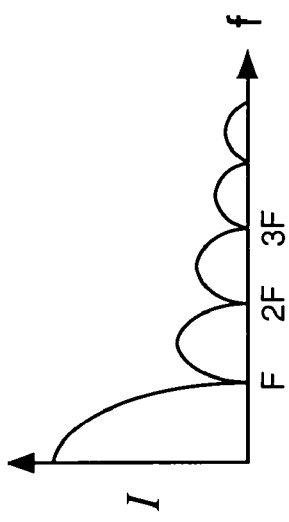
FIGS. 8A and 8B are frequency-domain graphs showing a composite optical signal with and without an added low-level sub-carrier modulation.
Figure 8B:
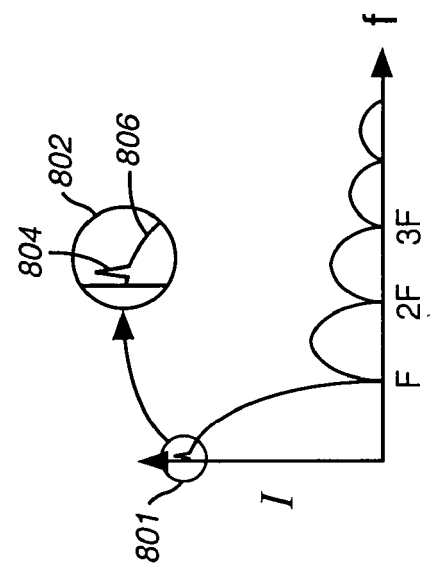

FIGS. 8A and 8B are frequency-domain graphs showing a composite optical signal with and without an added low-level sub-carrier modulation in accordance with the third embodiment of the present invention. FIG. 8A shows a power spectrum of an non-return-to-zero (NRZ) coded digital signal commonly used as a modulating signal such as signal 602. For example, a 1 Gbps NRZ signal will have a DC component as well as spectral nulls at multiples of 1 GHz.

FIG. 8B shows the power spectrum of an NRZ-coded digital signal with an added low-level, low frequency sub-carrier in accordance with the present invention. Within the graphical area 801 that is shown magnified in inset 802, the added signal appears as a minor peak 804 at the low frequency end atop a much larger peak 806 contributed by the main data signal. This spectral plot shows that the superimposed sub-carrier is readily distinguishable from the surrounding spectrum using, for example, a narrow bandwidth phase-locked loop tone detector as is well known to those skilled in the art.

Figure 9:
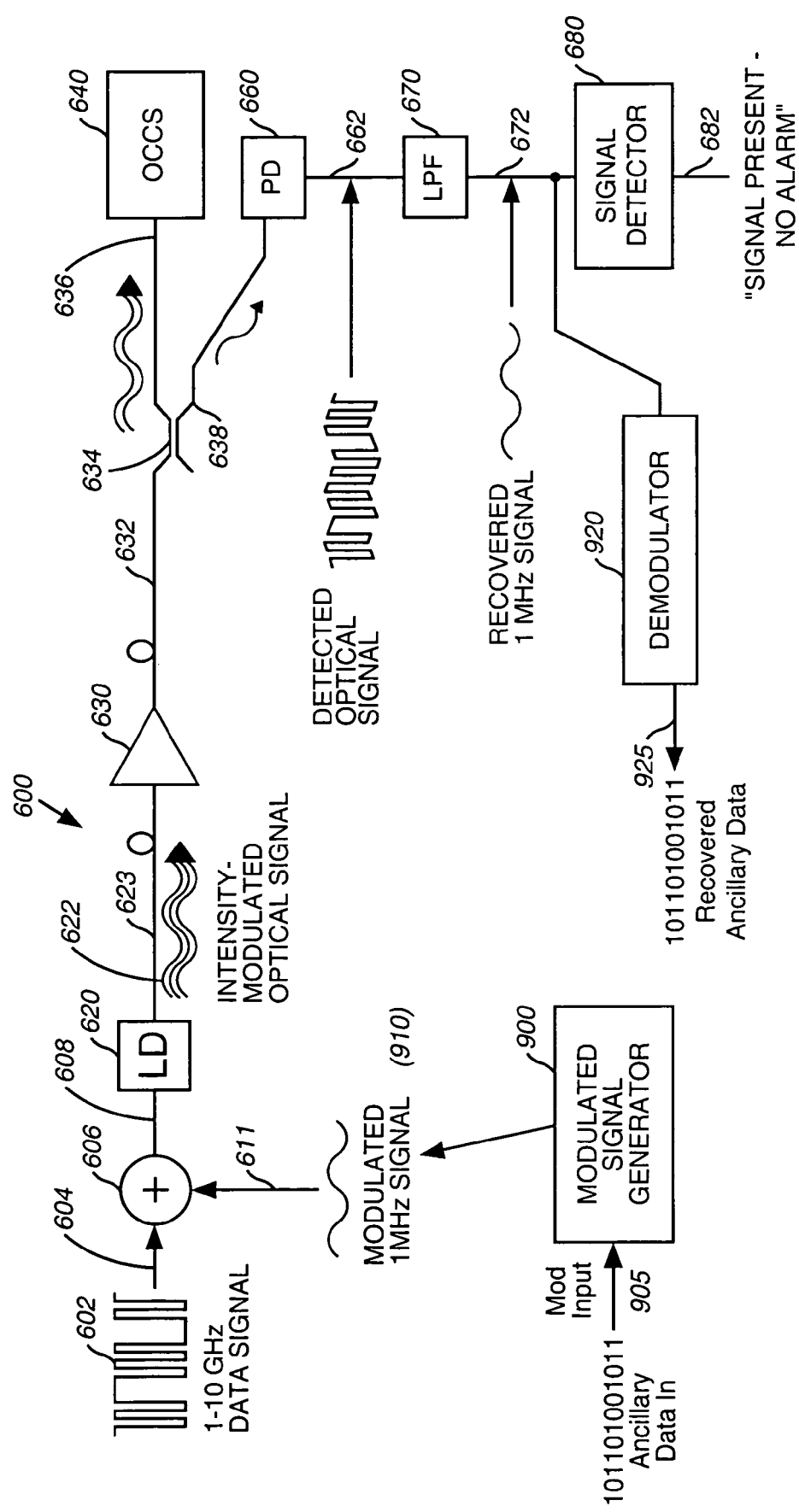
FIG. 9 is a block diagram of a technique for transporting and recovering ancillary network data using a sub-carrier modulation signal.

FIG. 9 is a block diagram of a technique for transporting and recovering ancillary network data using a sub-carrier modulation signal in accordance with a fourth embodiment of the present invention. As indicated by the identical reference numerals, the diagram contains many of the system elements for inserting and detecting a sub-carrier modulation signal over a communication link 600 as described in detail above with respect to FIG. 6.

Modulated signal generator 900 and demodulator 920 are added for generating and extracting a sub-carrier modulation signal 910 having ancillary network data. Modulated signal generator 900 receives ancillary network data at an input 905 and outputs a sub-carrier modulation signal 910 containing the ancillary network data through an input 611 at signal combiner 606. Demodulator 920 is coupled to the low-pass filter 670 at the receiver end of link 600. Demodulator 920 then receives and demodulates the replica 672 of the sub-carrier modulation signal 610 to recover the ancillary network data.

The recovered ancillary network data is provided at output 925 for use by a network manager in network management and other operations. The recovered ancillary network data can be sent over separate data links to the network manager. The network manager can be any type of a network managing and operations system, such as, a central network management system controlling each network node and/or a local node controller for controlling the link or node which includes the demodulator. Modulated signal generator 900 can utilize any conventional signal modulation scheme to impart ancillary network data in sub-carrier modulation signal 910 including, but not limited to, Amplitude Modulation (AM), Frequency Modulation (FM), Asynchronous Shift Keying (ASK), Frequency Shift Keying (FSK), and Phase Shift Keying (PSK). The ancillary network data can further be encoded and/or encrypted according to network or customer needs. In one example, the modulated signal generator 900 includes a signal generator which generates a low-level 1 MHz sub-carrier to modulate laser diode 620. Ancillary network data received through input 905 is represented by digital and/or analog electrical signals which are used as a modulation input to modulate the 1 MHz sub-carrier.

Moreover, any format, also called an "address signature," can be used to embed ancillary network data on a sub-carrier modulation signal. The ancillary network data can include different types of embedded information, called "data types," which characterize different kinds of network elements used in different network management purposes.

Figure 10:
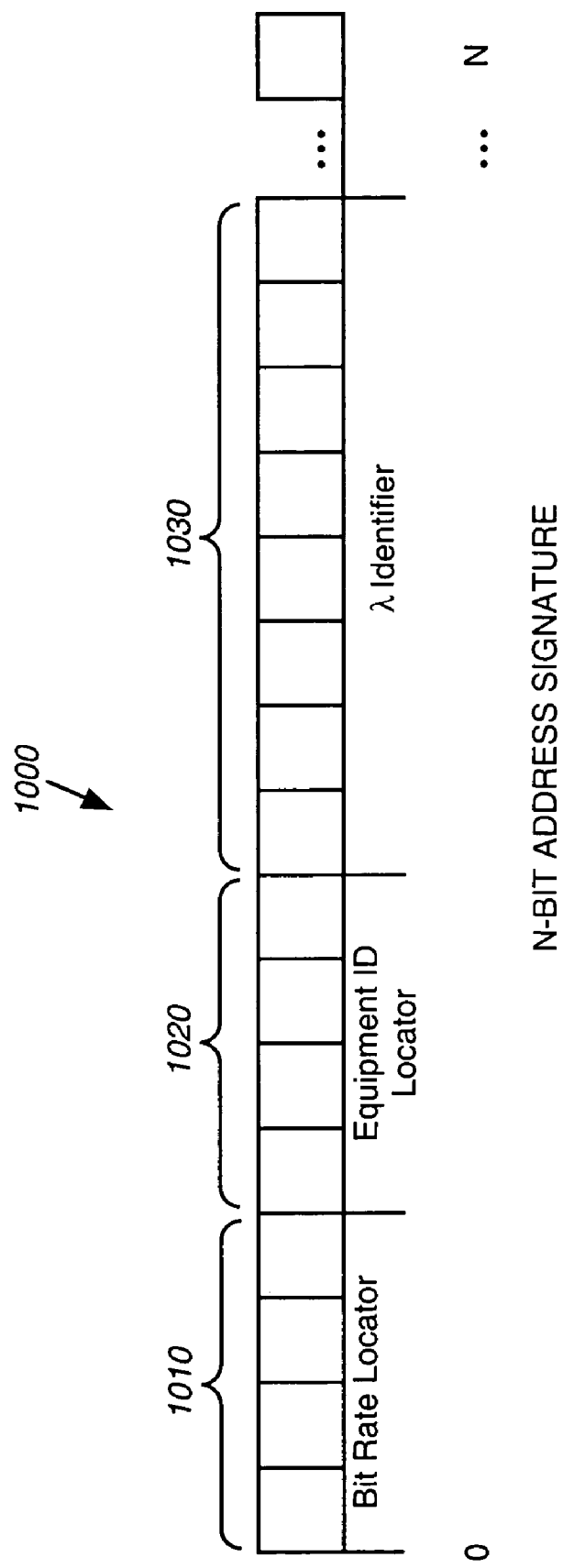
FIG. 10 is a representative address signature for ancillary network data.

FIG. 10 shows an example of an address signature 1000 representing ancillary network data according to the present invention. The address signature 1000 has three fields 1010-1030 reserved for specific data types. Field 1010 contains four-bits for bit rate locator information which allows the data bit rate for the main optical data signal, i.e., up to eight SONET protocols OC-1 to OC-192, to be determined. Field 1020 utilizes four-bits to identify a piece of Equipment. Field 1030 encodes a wavelength identifier identifying the particular wavelength of the high-data rate carrier optical signal. Eight bits are used to uniquely identify one of possible 512 wavelengths in a WDM system.

The address signature 1000 has N-bits, where N represents an integer. Additional data types can embedded in any order. The number of bits used for each data type can also be varied. Table 1 lists additional examples of different data types which can be embedded in any combination as ancillary network data. Other data types can also be embedded.

TABLE 1

DATA TYPES

| | | |
|---|---|---|
| IDENTIFIER | TYPE | MANUFACTURER |
| MODEL NUMBER | PARITY | CAPABILITY/AVAILABILITY INDICATORS |
| LOCATION | DIRECTION | OPERATING PARAMETERS |
| QUANTITIES | FREE-FORM DATA | ORDINAL VALUE |
| TIME | DATE | ENCODED CONTROL COMMAND |
| SIGNAL LEVEL | NOISE LEVEL | ERROR RATE |
| QUALITY VALUE | TRACEABILITY | |

Data type information is applicable to, and further accompanied by, any information identifying any combination of the following network elements, as shown in Table 2. Other network elements can also be identified.

TABLE 2

NETWORK ELEMENTS

| | | |
|---|---|---|
| LINE | LINK | SECTION |
| CHANNEL | PATH | ROUTE |
| SITE | SPAN | SECTION |
| WAVELENGTH | SIGNAL | SOURCE/DESTINATION |
| FIBER | CABLE | TRANSMISSION MEDIA |
| EQUIPMENT | ELEMENT | PAYLOAD |
| TRUNK | TRACEABILITY | PORT |

Ancillary network data including data type and/or network elements can be provided for different kinds of network management purposes. As used herein, network management purposes is meant in its widest possible meaning which includes, but is not limited to, the following management purposes listed in Table 3.

TABLE 3

NETWORK MANAGEMENT PURPOSES

| | |
|---|---|
| PROVISIONING | NETWORK CONTROL AND RESTORATION |
| MAINTENANCE | PERFORMANCE MONITORING |
| SERVICE CHANNEL | WAVELENGTH USE, TRACKING, AND CONTROL |
| TELEMETRY | PROBING NETWORK TOPOLOGY |
| CUSTOMER USE | PRIORITY DESIGNATION |
| ALARM GENERATION/TRANSMITTAL | PATH OPTIMIZATION |

The network applications for transporting ancillary network data are broad and far-ranging. Six examples of network applications including tracing network timing references, cumulative link identification, wavelength re-mapping and re-use, telemetry and transmission performance evaluation, customer data payload identification, operational status indication, and/or other network management operations are described below to illustrate the capability and power of the present invention. Each network application transports one or more embedded data types which are applicable to network elements for an associated network management purpose as recited in Table 4.

TABLE 4

EXAMPLE APPLICATIONS

| EMBEDDED ANCILLARY DATA TYPE | APPLICATION NETWORK ELEMENT | NETWORK MANAGEMENT PURPOSE |
|---|---|---|
| 1. AN INDEX OF TRACEABILITY TO A NETWORK TIMING REFERENCE | AN INBOUND LINK | SELECTING THE BEST AVAILABLE TIMING REFERENCE SIGNAL |
| 2. CUMULATIVE LINK IDENTIFIERS | A SIGNAL | INDICATING THE ACTUAL PATH TAKEN |

TABLE 4-continued

EXAMPLE APPLICATIONS

| EMBEDDED ANCILLARY DATA TYPE | APPLICATION NETWORK ELEMENT | NETWORK MANAGEMENT PURPOSE |
|---|---|---|
| 3. WAVELENGTH UTILIZATION TABLES | A COMPOSITE WDM SIGNAL | MAPPING FOR WAVELENGTH ROUTING/REUSE |
| 4. SIGNAL/NOISE LEVELS | A REMOTE RECEIVER | TELEMETRY OF PERFORMANCE DATA |
| 5. CUSTOMER IDENTIFIER | A PAYLOAD | PROVISIONING |
| 6. OPERATIONAL STATUS INDICATORS | REMOTE SPARE ELEMENTS | RESTORATION IN EVENT OF FAILURE |

In application 1, the ancillary network data type consists of an index of traceability to a network timing reference. This index of traceability applies to an inbound link, i.e., a SONET data link, and can be used by a network management system to trace and select the best available timing reference signal for synchronization.

In application 2, the ancillary network data type include cumulative link identifiers applicable to network signals. Cumulative linking identifiers can identify an originating link, destination link, and/or any intermediate link. These cumulative linking identifiers can be added to the ancillary network data of a data signal at each link along a network path. In this way, the cumulative linking identifiers can be readout from the ancillary network data at a receiver end of a path to indicate the actual path taken by a signal through the network.

In application 3, wavelength utilization tables are included in the ancillary network data. In WDM systems, a composite wavelength division multiplexing signal is rerouted and mapped to other spare or pre-emptible wavelengths in the event of failure or congestion at a working wavelength. Heretofore, this wavelength routing and re-use information needed to be predetermined and stored at network nodes limiting the versatility and response of nodes for restoration operations.

According to the present invention, however, these wavelength utilization tables can be transported in ancillary network data throughout the network. After demodulating and recovering the ancillary network data, any node can then read and incorporate the wavelength tables for traffic management and restoration purposes, such as, wavelength routing and re-use.

In application 4, initial signal and/or noise levels of a data signal are embedded as ancillary network data. In this way, performance data regarding the telemetry of a network path and/or link can be determined. For example, the intensity of a received data signal can be detected at a remote receiver and compared against the initial signal and noise levels embedded in the ancillary network data.

In another example, the error rate of received ancillary network data can be used as an indicator of the quality of the high-data rate carrier transmission signal. Any type of error rate check for evaluating the transmission of an analog and/or digital data signal can be used by a network manager. For example, a network manager can determine the bit-error rate, perform a cyclic-redundancy-check (CRC), and/or check bits corresponding to test flags, for the ancillary network data carried by the sub-carrier modulation signal in any of the applications described herein. Test messages can also be embedded and transported either alone or in addition to other ancillary network data described herein.

By detecting intensity level and/or error rate in the sub-carrier signal, links with poor or degraded transmissivity are quickly detected. Because the sub-carrier signal can be tapped or coupled out at any point along a link or path, intermediate path performance monitoring is possible (like SONET capability). Degradation points and faults can then be detected and isolated to a particular location along a path.

In application 5, customer identifier information is included in ancillary network data. This customer identifier applies to a particular data payload and can be used for network provisioning. The customer identifier can also be used for tracing customer data, determining frequently used areas of a network, and other statistical analysis.

Finally, in application 6, operational status indicators are embedded in the ancillary network data. The operation status indicators identify the status and/or availability of remote spare elements for restoration purposes. For example, a status indicator can identify whether a fiber link represents a working link, a spare link, or an out-of-service link. In the event of a network failure, the ancillary network data can be read at a node to determine available remote spare elements. In this way, restoration can be achieved effectively without prior knowledge of network topology or design. The above six applications are illustrative; given this description, further applications would have been obvious to one skilled in the art.

The preferred embodiment of the present invention allows for transmittal of a low data rate signal providing ancillary network data as a rider on a high data rate optical signal. This sub-carrier modulated signal can be detected by inexpensive equipment without having to detect and demultiplex the high data rate signal. Ancillary network management information can be communicated regardless of the quality or loss of the high data rate signal.

The availability of an adjunct sub-carrier channel opens a myriad of possible applications. Of particular importance are the possibilities for improving restoration, wavelength routing, and general network management. The advances brought about by the method and system for transporting ancillary network data according to the present invention is very timely, as the telecommunications industry moves rapidly towards perfecting the next generation of all-optical networks.

Figure 11:
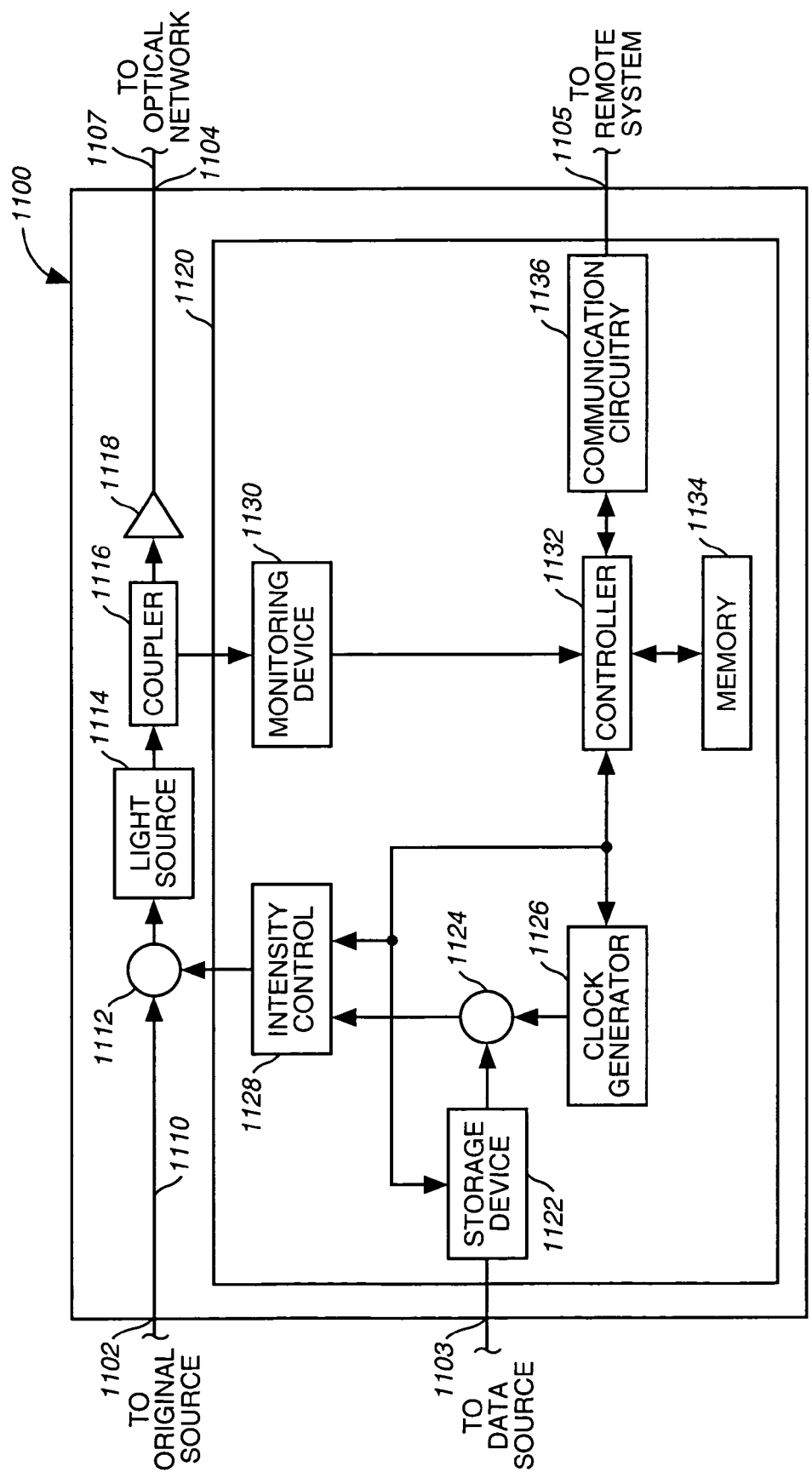
FIG. 11 is a functional block diagram of an exemplary optical communication apparatus according to an aspect of the present invention.

Referring to FIG. 11, an exemplary optical communication apparatus 1100 is shown. One configuration of optical communication apparatus 1100 is a Line Terminal Equipment (LTE) device. Other configurations are possible.

The depicted optical communication apparatus 1100 has a plurality of interfaces 1102-1105. Interface 1102 is adapted to couple with a signal source and interface 1103 is adapted to couple with a data source (the signal source and data source are not shown in FIG. 11). An exemplary signal source comprises data remote equipments configured to provide a data signal as described above (e.g., computers, remote terminals, servers, etc.). An exemplary data source provides ancillary network data described above. Interfaces 1102, 1003 are coupled with other signal sources and data sources in other configurations.

Interface 1104 is adapted to couple with an optical network and interface 1105 is adapted to couple with a remote system in the depicted arrangement. For example, interface 1104 is shown coupled with an optical conduit 1107 of an optical network (the remote system and other components of the optical network are not shown). An exemplary optical conduit 1107 coupled with interface 1104 comprises a fiber optic link of a span intermediate plural sites of a communication network. In one configuration, optical communication apparatus 1100 is provided within a given site of the communication network. An exemplary remote system coupled with interface 11 05 comprises a network management system according to one aspect of the present invention.

Internally of the depicted optical communication apparatus 1100, a communication path 1110, a signal combiner 1112, a light source 1114, a coupler 1116 and an optical amplifier 1118 are provided. In addition, the depicted optical communication apparatus 1100 includes a signal generator 1120. Signal generator 1120 is configured to output a data signal. According to the described embodiment, signal generator 1120 comprises a sub-carrier signal generator configured to output a modulated sub-carrier signal (e.g., signal 610 described above).

An exemplary signal generator 1120 includes a storage device 1122, a combiner 1124, a clock generator 1126, an intensity circuit control 1128, a monitoring device 1130, a controller 1132, a memory 1134 and a communication circuit 1136. Other configurations of signal generator 1120 are possible.

In general, a signal (e.g., signal 602 described above) to be communicated is received via interface 1102 from an associated signal source. Communication path 1110 is configured to communicate the signal to combiner 1112 and to light source 1114. In the described configuration of optical communication apparatus 1100, communication path 1110 communicates signals within the electrical domain.

Light source 1114 is coupled with combiner 1112 and is configured to receive signals from combiner 1112 and to output optical signals corresponding to the signals received from combiner 1112. Typical inputted signals to light source 1114 comprise electrical signals and light source 1114 outputs optical signals which correspond to the received electrical signals. An exemplary light source 1114 comprises a photodiode.

Light source 1114 operates to apply optical signals to optical conduit 1107 coupled with interface 1104. In the depicted embodiment, coupler 116 operates to receive optical signals from light source 1114 and to apply the optical signals to optical amplifier 1118 and signal generator 1120. Optical amplifier 1118 operates to amplify optical signals to be outputted via interface 1104.

Signal generator 1120 is configured to provide a signal to combiner 1112 as shown in FIG. 11. In an exemplary embodiment, the outputted signal from signal generator 1120 corresponds to data (e.g., ancillary network management data) received via interface 1103 from an associated data source. The data received by interface 1103, which comprises digital data in the described embodiment, is provided to a storage device 1122 such as a register (e.g., a shift register). Thereafter, received data from interface 1103 is applied to combiner 1124.

A clock generator 1126 operates to apply a sub-carrier signal in the illustrated embodiment to combiner 1124. Combiner 1124 operates to generate a composite signal of the data received from storage device 1122 and the outputted signal from clock generator 1126. Combiner 1124 modulates the sub-carrier signal with the signal from storage device 1122 to provide a composite signal comprising a modulated sub-carrier signal in one embodiment. For example, the storage device 1122 can hold network management data that can be applied to data signals via a sub-carrier. In the described configuration, combiner 1124 is configured to output the composite signals comprising modulated sub-carrier signals to intensity control 1128.

Intensity control 1128 is configured to alter or adjust the amplitude of the composite signal outputted from combiner 1124. The adjusted amplitude will adjust the intensity of the optical signal generated at light source 1114, and therefore can be referred to as an intensity adjusted signal. Thereafter, the intensity adjusted modulated sub-carrier signal is applied to combiner 1112. Combiner 1112 operates to combine the signal received from interface 1102 with the modulated sub-carrier signal (from circuit 1128) to provide another composite signal, also referred to as an input signal, which is applied to light source 1114. In the described configuration, combiner 1112 modulates the signal received from interface 1102 with the signal from signal generator 1120.

Using coupler 1116, signal generator 1120 is configured to monitor communications via optical conduit 1107 coupled with interface 1104. In one embodiment, signal generator 1120 is configured to monitor the application of the optical signal to optical conduit 1107. Signal generator 1120 is further configured to alter the signal applied to combiner 1112 responsive to the monitoring.

In the described embodiment, monitoring device 1130 of signal generator 1120 receives the composite signal outputted from combiner 1112 and light source 1114. An exemplary monitoring device 1130 is described above with reference to FIG. 9. In one configuration, monitoring device 1130 is configured to monitor for the presence of reflected light. More specifically, in the described configuration, monitoring device 1130 comprises a photodetector configured to receive light reflected backward from interface 1104 and optical conduit 1107. For example, monitoring device 1130 of signal generator 1120 is configured to monitor Stimulated Brillouin Scattering (SBS) according to aspects of the present invention.

Controller 1132 is configured to receive outputted signals from monitoring device 1130 corresponding to the monitoring of communications thereby. An exemplary controller 1132 comprises an embedded microprocessor, computer, workstation, or other type of processor. 0118 As depicted, controller 1132 is coupled with storage device 1122, clock generator 1126, intensity control 1128, memory 1134 and communication circuitry 1136. In an exemplary configuration, memory 1134 includes random access memory (RAM) and read only memory (ROM). Memory 1134 is configured to store data pertaining to operations of optical communication apparatus 1100 as well as operational code configured to control the operations of controller 1132.

Controller 1132 is configured to alter signals outputted from signal generator 1120 applied to combiner 1112 responsive to monitoring of communications using monitoring device 1130. In one embodiment, controller 1132 causes altered outputted signals to be applied to combiner 1112 from signal generator 1120 to minimize reflected light or power responsive to the application of communication signals to optical conduit 1107. According to certain aspects of the present invention, controller 1132 causes signals outputted from signal generator 1120 be altered and then applied to combiner 1112 to reduce Stimulated Brillouin Scattering resulting from the application of communication signals to optical conduit 1107.

As described in detail below, signal generator 1120 is configured to adjust modulation depth (i.e., intensity) and optical modulation bandwidth of signals outputted from signal generator 1120 and applied to combiner 1112. Signal generator 1120 outputs a variable intensity and variable bandwidth signal to combiner 1112 to reduce reflected light resulting from the application of signals to optical conduit 1107 from amplifier 1118.

Stimulated Brillouin Scattering is proportional to the intensity of optical signals, and is inversely proportional to the bandwidth of optical signals. Signal generator 1120 is configured to vary the intensity of signals applied to combiner 1112 according to some aspects of the present invention. Intensity control 1128 comprises a variable intensity control in the described embodiment to implement the desired intensity adjustment. Controller 1132 controls intensity control 1128 to attenuate or increase the intensity of signals applied to combiner 1112 to reduce Stimulated Brillouin Scattering as monitored by monitoring device 1130.

Signal generator 1120 varies the bandwidth of signals applied to combiner 1112 to reduce Stimulated Brillouin Scattering according to other aspects of the invention. In one arrangement, signal generator 1120 is configured to adjust the clock rate and/or add data to signals applied to combiner 1112 to implement varying of the bandwidth of such signals.

In the described embodiment, controller 1132 controls adjustment of clock speed of clock generator 1126 to adjust clock rates (i.e., frequency) of signals applied to combiner 1112 from signal generator 1120. An exemplary adjustment range of clock generator 1120 is from 10 kHz to 10 MHz. Controller 1132 controls storage device 1122 to input dummy data into the received data. For example, controller 1132 controls storage device 1122 to input dummy data comprising a series of digital ones following the wavelength identifier field of the address signature shown in FIG. 10 above.

In one configuration, controller 1132 utilizes a look-up table within memory 1134 to control one or more of intensity control 1128, clock generator 1126 and the inputting of dummy data using storage device 1122 responsive to measured values of Stimulated Brillouin Scattering provided by monitoring device 1130. The rate of network management data and the dummy data, which are both variable, are inversely proportional to SBS. As a result, varying the rate of this data will adjust SBS.

Controller 1132 is configured to communicate with the remote system coupled with interface 1105 using communication circuitry 1136. Communication circuitry 1136 comprises full duplex circuitry in the described embodiment permitting bi-directional communications intermediate optical communication apparatus 1100 and the remote system. A selected digital signaling protocol, such as X.25, Frame Relay, ATM, B-ISDN or Common Channel Signaling 7 protocols, is utilized in the described embodiment to implement communications intermediate the remote system and communication circuitry 1136. Other communication methodologies are used in other embodiments.

In an exemplary mode of operation, controller 1132 applies signals indicative of the monitoring of the optical conduit to the remote system. Such signals indicate the amount of Stimulated Brillouin Scattering according to certain aspects of the present invention. In addition, controller 1132 communicates clock rate information of signals outputted from clock generator 1126, and intensity information of signals applied to combiner 1112 using information from intensity control 1128. Other information is exchanged intermediate optical communication apparatus 1100 and the remote system according to other aspects of the invention.

Figure 12:
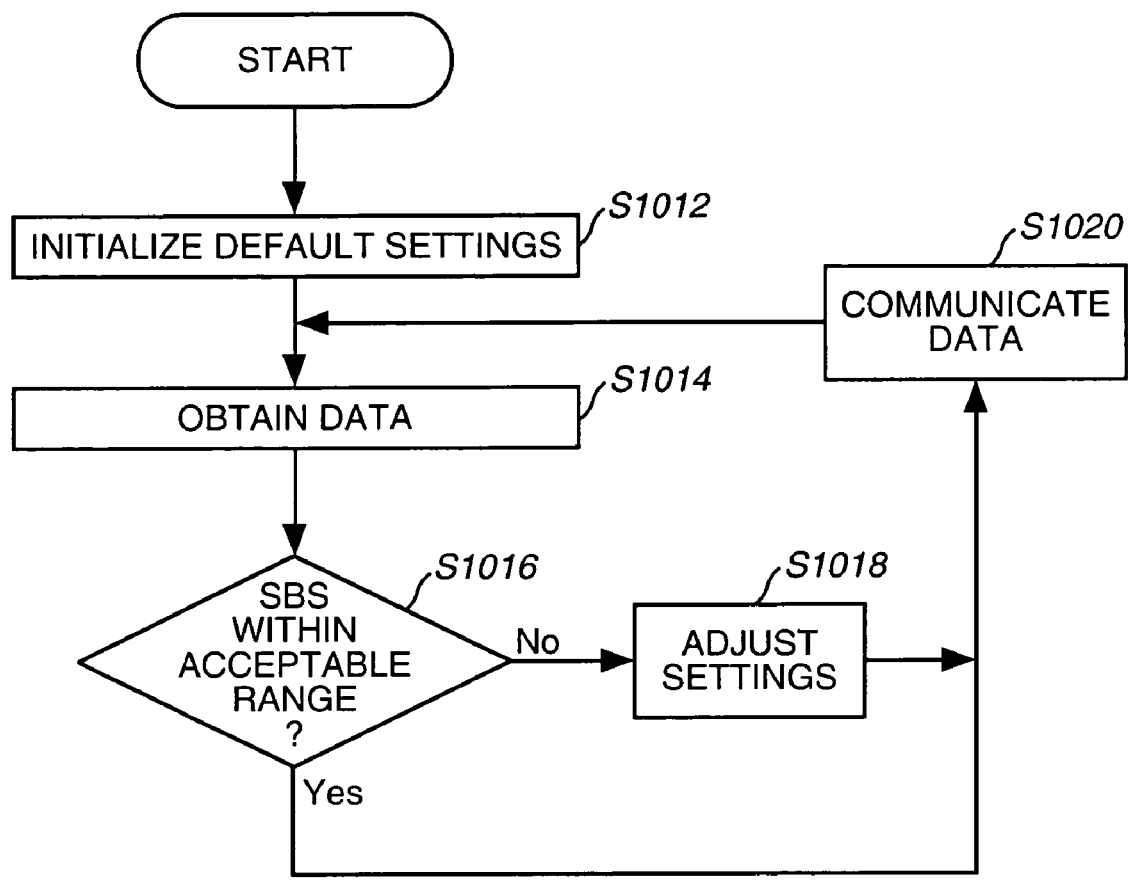
FIG. 12 is a flow chart illustrating exemplary operations of the optical communication apparatus of FIG. 11.

Referring to FIG. 12, exemplary control operations of controller 1132 are depicted. The illustrated methodology of FIG. 12 is implemented within executable code stored within memory 1134 according to one aspect of the present invention. Alternatively, controller 1132 includes hardware configured to perform the illustrated methodology.

Initially, controller 1132 proceeds to step S1012 to initialize storage device 1122, clock generator 1126 and intensity control 1128 with default settings. For example, controller 1132 selectively instructs storage device 1122 to insert dummy data, sets the clock rate of clock generator 1126 and sets the intensity level of intensity control 1128. As discussed above, the initial settings can be taken from a look up table. This table can be developed by looking to other systems or previous uses of this system as a guideline. When the initial setting can be made more accurate, the procedure will take fewer iterations to optimize. This table is generated for all fiber types; upon initial turn up, the system engineer is queried to indicate the fiber type whereupon that setting is loaded as the initial setting.

Figure 13:
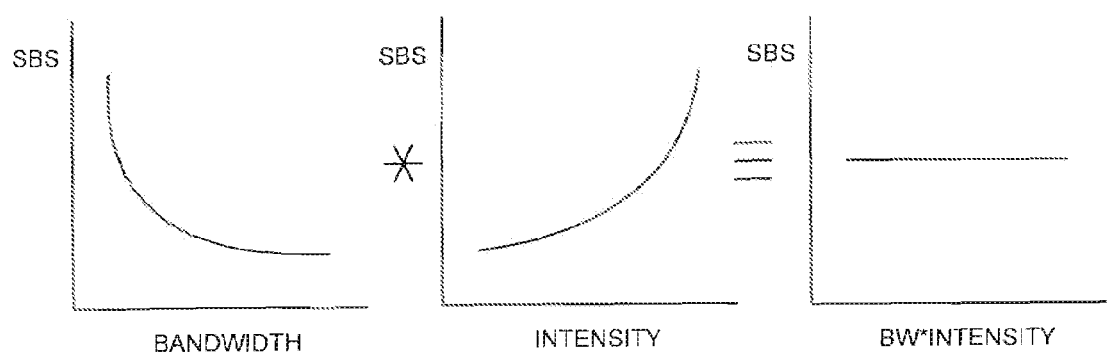
FIG. 13 provides a series of graphs showing the relationship between bandwidth and intensity and Stimulated Brillouin Scattering.

Thereafter, controller 1132 proceeds to optimize the settings of storage device 1122, clock generator 1126 and intensity control 1128. Controller 1132 convolves the intensity adjustment and bandwidth of signals applied to combiner 1112 from signal generator 1120 to minimize Stimulated Brillouin Scattering resulting from the application of optical signals to optical conduit 1107. This convolution is illustrated in FIG. 13, which shows the relationship between bandwidth and SBS and intensity and SBS. The convolution is a three-dimensional function. One goal is to minimize and/or adjust the average value of the function.

Following application of default settings, controller 1132 proceeds to step S1014 to obtain data from monitoring device 1130 during communications of optical signals to optical conduit 1107 from optical amplifier 1118.

Controller 1132 then proceeds to step S1016 to determine whether the Stimulated Brillouin Scattering is within an acceptable range. For example, controller 1132 determines whether the Stimulated Brillouin Scattering is an acceptably low value. For example, this algorithm can minimize SBS by varying the bandwidth and intensity and plotting SBS as shown in FIG. 13.

If the condition of step S1016 is not satisfied, controller 1132 proceeds to step S1018 to adjust the settings of one or more of storage device 1122, clock generator 1126 and/or intensity control 1128 to alter the intensity level and/or bandwidth of signals outputted from signal generator 1120 and applied to combiner 1112.

In an exemplary configuration, controller 1132 determines the appropriate clock rate of clock generator 1126 to alter the bandwidth of the signal applied to combiner 1112 from signal generator 1120 to minimize Stimulated Brillouin Scattering as detected within monitoring device 1130. Following a determination of the appropriate clock rate, controller 1132 adjusts intensity control 1128 while analyzing the results from monitoring device 1130 to determine the appropriate intensity level for minimizing Stimulated Brillouin Scattering. Controller 1132 also controls storage device 1122 to selectively add dummy data to data received from interface 1103 to further alter the bandwidths of signals applied to combiner 1112 from signal generator 1120.

Following step S1018, or responsive to an affirmative condition within step S1016, controller 1132 proceeds to step S1020 to communicate appropriate data to the remote system coupled with interface 1105. For example, controller 1132 communicates setting information of storage device 1122, clock generator 1126 and intensity control 1128. Additionally, controller 1132 includes Stimulated Brillouin Scattering information for communication to the remote system in the described operation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical communication apparatus comprising:
a communication path configured to communicate a first signal;
a signal generator configured to provide a second signal;
a combiner configured to combine the first signal and the second signal to provide a composite signal; and
a light source coupled with the combiner and configured to receive the composite signal and to apply an optical signal corresponding to the composite signal to an optical conduit,
where the signal generator is configured to monitor reflected light in the optical conduit, to adjust a bandwidth of the second signal responsive to the monitoring by adjusting a clock rate of the second signal and adding data to the second signal, and to adjust an intensity of the second signal responsive to the monitoring by attenuating or increasing the intensity of the second signal.

2. The apparatus according to claim 1 further comprising communication circuitry adapted to couple with a remote system and to communicate a signal indicative of the monitoring to the remote system.

3. The apparatus according to claim 1 wherein the signal generator is configured to monitor Stimulated Brillouin Scattering.

4. The apparatus according to claim 1 wherein the signal generator comprises a sub-carrier signal generator configured to provide the second signal comprising a sub-carrier signal.

5. The apparatus according to claim 1, further comprising a memory to store a lookup table, the lookup table storing initialization values to be used by the signal generator to determine initial properties of the second signal.

6. The apparatus according to claim 5 wherein the initialization values are determined by a characteristic of the optical conduit.

7. An optical communication apparatus comprising:
a light source adapted to couple with an optical conduit and configured to apply an optical signal, responsive to an input signal that includes a combination of a first signal and a second signal, to the optical conduit; and
a signal generator configured to:
monitor Stimulated Brillouin Scattering during application of the optical signal to the optical conduit,
adjust a bandwidth of the second signal responsive to the monitoring by adjusting a clock rate of the second signal and adding data to the second signal, and
adjust an intensity of the second signal responsive to the monitoring by attenuating or increasing the intensity of the second signal.

8. The apparatus according to claim 7 further comprising a combiner configured to combine the first signal and the second signal to provide the input signal.

9. The apparatus according to claim 8 wherein the combiner is configured to modulate the first signal comprising a data signal with the second signal comprising a sub-carrier signal.

10. The apparatus according to claim 7 wherein the signal generator is adapted to couple with a remote system and to communicate a signal indicative of the monitoring to the remote system.

11. The apparatus of claim 7 further comprising a memory to store a lookup table, the lookup table storing initialization values to be used by the signal generator.

12. An optical device comprising:
a signal combiner having a first signal input, a second signal input, and an output, wherein the second signal input comprises a sub-carrier signal that includes a frequency substantially less than a frequency of the first signal input;
an electrical-to-optical converter having an electrical signal input coupled to the output of the signal combiner, the electrical-to-optical converter having an optical signal output that is applied to an optical conduit;
a monitoring device coupled to the optical conduit and configured to monitor reflected light in the optical conduit; and
a signal generator with an input coupled to the monitoring device and an output coupled to the second signal input of the signal combiner, the signal generator adjusting a bandwidth of the second signal based on the reflected light in the optical conduit, by adjusting a clock rate of the second signal and adding data to the second signal, and adjusting an intensity of the second signal based on inputs received from the monitoring device by attenuating or increasing the intensity of the second signal.

13. The device of claim 12 wherein the signal generator comprises:
a controller coupled to receive a signal from the monitoring device from the signal generator input; and
an electrical signal generator coupled to the memory and providing an electrical signal to the output of the signal generator, the controller determining at least one feature of the electrical signal.

14. The device of claim 13 wherein the at least one feature comprises an amplitude.

15. The device of claim 13 wherein the at least one feature comprises a bandwidth.

16. The device of claim 13 wherein the electrical signal generator comprises:
a clock generator with an input coupled to an output of the controller; and
signal combiner with a first input coupled to an output of the clock generator and a second input coupled to a data source.

17. The device of claim 16 wherein the data source includes a memory device.

18. The device of claim 17 wherein the memory device is coupled to receive data from the controller.

19. A method of generating an optical signal, the method comprising:
- receiving, by a combiner, a first signal;
- generating, by a signal generator, a second signal;
- providing, by the combiner, an electrical signal that includes a combination of the first signal and the second signal;
- generating an optical signal from the electrical signal;
- monitoring, by the signal generator, the optical signal to determine the presence of reflected light;
- adjusting a bandwidth of the second signal based upon the results of the monitoring step by adjusting a clock rate of the second signal and adding data to the second signal; and
- adjusting an intensity of the second signal based upon the results of the monitoring step by attenuating or increasing the intensity of the second signal.

20. The method of claim 19 wherein monitoring the optical signal comprises receiving light reflected from an interface, the light being received by a photodetector.

21. The method of claim 19 wherein the electrical signal includes information to be communicated across an optical communications network.

22. The method of claim 21 wherein the electrical signal further includes additional signaling that is modulated upon the information to be communicated across the optical communication network.

23. The method of claim 22 further comprising:
- adjusting a bandwidth and an intensity of the additional signaling.

24. The method of claim 22 wherein the additional signaling provides information about the optical communication network.

25. An optical communication method comprising:
- providing a first signal and a second signal, the second signal being provided by a signal generator;
- combining the first signal and the second signal to provide a composite signal;
- generating an optical signal corresponding to the composite signal;
- applying the optical signal to an optical conduit;
- monitoring reflected light in the optical conduit with the signal generator;
- adjusting a bandwidth of the second signal responsive to the monitoring by adjusting a clock rate of the second signal and adding data to the second signal; and
- adjusting an intensity of the second signal responsive to the monitoring by attenuating or increasing the intensity of the second signal.

26. The method according to claim 25 further comprising communicating a signal indicative of the monitoring to a remote system.

27. The method according to claim 25 wherein the monitoring comprises monitoring Stimulated Brillouin Scattering.

28. The method according to claim 25 wherein the combining comprises modulating the first signal comprising a data signal with the second signal comprising a sub-carrier signal.

29. The method according to claim 25 further comprising determining the initial properties of the second signal based upon a characteristic of the optical conduit.

30. The method of claim 29 wherein the characteristic of the optical conduit comprises a fiber type.

31. An optical communication method comprising:
- providing, by an electrical-to-optical converter, an optical signal that includes a combination of a first signal and a second signal;
- applying the optical signal to an optical conduit;
- monitoring, by a signal generator, Stimulated Brillouin Scattering during the applying;
- adjusting a bandwidth of the second signal responsive to the monitoring by adjusting a clock rate of the second signal and adding data to the second signal; and
- adjusting an intensity of the second signal responsive to the monitoring by attenuating or increasing the intensity of the second signal.

32. The method according to claim 31 wherein the providing the optical signal comprises combining the first signal and the second signal.

33. The method according to claim 32 wherein the combining comprises modulating the first signal comprising a data signal with the second signal comprising a sub-carrier signal.

34. The method according to claim 31 further comprising communicating a signal indicative of the monitoring to a remote system.

* * * * *